United States Patent
Miyairi et al.

(10) Patent No.: US 8,361,592 B2
(45) Date of Patent: Jan. 29, 2013

(54) HONEYCOMB STRUCTURE, HONEYCOMB CATALYTIC BODY AND MANUFACTURING METHOD OF THE SAME

(75) Inventors: Yukio Miyairi, Nagoya (JP); Yoshihiro Yamamoto, Tsu (JP); Shogo Hirose, Gifu (JP)

(73) Assignee: NGK Insulators, Ltd., Nagoya (JP)

( * ) Notice: Subject to any disclaimer, the term of this patent is extended or adjusted under 35 U.S.C. 154(b) by 813 days.

(21) Appl. No.: 12/325,083

(22) Filed: Nov. 28, 2008

(65) Prior Publication Data
US 2009/0176053 A1 Jul. 9, 2009

(30) Foreign Application Priority Data

Dec. 3, 2007 (JP) .................................. 2007-312042
Nov. 13, 2008 (JP) .................................. 2008-290753

(51) Int. Cl.
*B32B 3/12* (2006.01)
(52) U.S. Cl. .................. 428/116; 156/89.22; 55/524
(58) Field of Classification Search .................. None
See application file for complete search history.

(56) References Cited

U.S. PATENT DOCUMENTS

| | | | |
|---|---|---|---|
| 2003/0167755 A1 | 9/2003 | Nakatani et al. | |
| 2004/0166035 A1 | 8/2004 | Noda et al. | |
| 2004/0172929 A1* | 9/2004 | Itoh et al. | 55/523 |
| 2005/0037147 A1 | 2/2005 | Ogunwumi et al. | |
| 2006/0228271 A1* | 10/2006 | Zhang et al. | 422/177 |
| 2007/0048494 A1 | 3/2007 | Miyairi et al. | |
| 2007/0063398 A1 | 3/2007 | Takahashi | |

FOREIGN PATENT DOCUMENTS

| | | |
|---|---|---|
| EP | 1 298 112 A1 | 4/2003 |
| EP | 1 696 109 A2 | 8/2006 |
| EP | 1 790 407 A1 | 5/2007 |
| EP | 1 847 320 A1 | 10/2007 |
| EP | 1 946 840 A1 | 7/2008 |
| JP | A 09-057099 | 3/1997 |
| JP | A-2003-33664 | 2/2003 |
| JP | A 2003-049627 | 2/2003 |
| JP | A 2004-298736 | 10/2004 |
| JP | A 2007-076984 | 3/2007 |
| JP | A-2010-104956 | 5/2010 |
| WO | WO 03/014539 A1 | 2/2003 |
| WO | WO 2007/026803 A1 | 3/2007 |

OTHER PUBLICATIONS

Nov. 18, 2011 European Search Report issued in EP 08 25 3852.1.
Partial European Search Report issued in European Patent Application No. 08253852.1 dated Jul. 13, 2011.

* cited by examiner

*Primary Examiner* — David Sample
(74) *Attorney, Agent, or Firm* — Oliff & Berridge, PLC

(57) ABSTRACT

There are disclosed a honeycomb structure capable of providing a honeycomb catalytic body which is excellent in purification efficiency with a small pressure loss and which can be mounted even in a limited space, a honeycomb catalytic body which is excellent in purification efficiency with a small pressure loss and which can be mounted even in a limited space, and a manufacturing method of the same. A honeycomb catalytic body 50 of the present invention is a honeycomb catalytic body of a flow-through type through which cells as through channels extend from an inlet to an outlet, both the surfaces of partition walls 4 of a honeycomb structure 1 and the inner surfaces of pores 25 carry a catalyst to form catalyst layers 5, and the catalyst carrying partition walls have a permeability of $1 \times 10^{-12}$ [m$^2$] or more, preferably $1 \times 10^{-9}$ [m$^2$] or less.

23 Claims, 15 Drawing Sheets

FIG.2
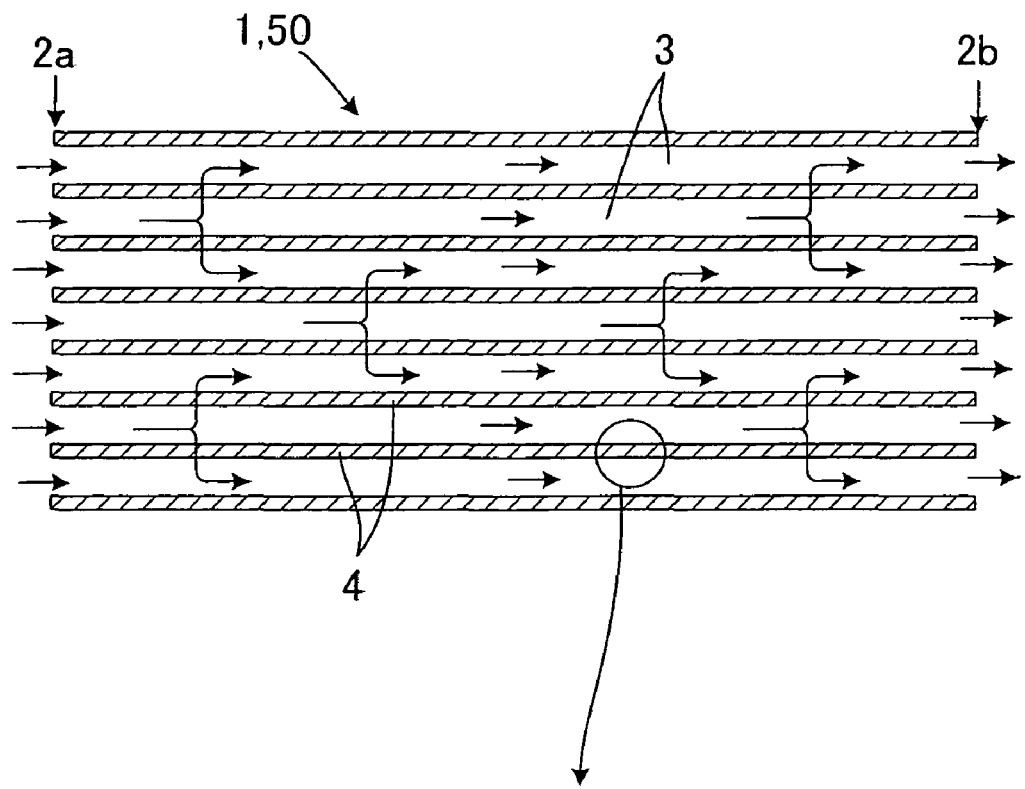
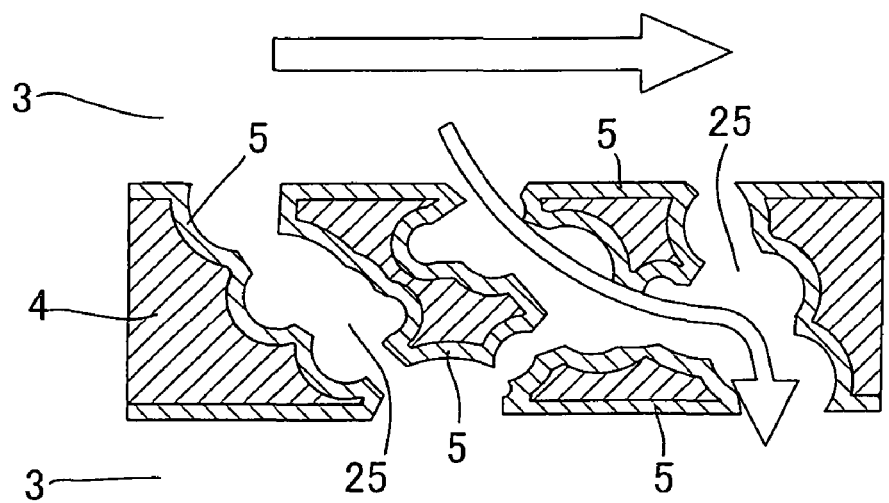

HONEYCOMB STRUCTURE, HONEYCOMB CATALYTIC BODY AND MANUFACTURING METHOD OF THE SAME

BACKGROUND OF THE INVENTION AND RELATED ART

The present invention relates to a honeycomb structure which is preferably used to remove components to be removed, for example, carbon monoxide (CO), hydrocarbons (HCs), nitrogen oxide ($NO_x$) and sulfur oxide ($SO_x$) included in an exhaust gas discharged from a stational engine for a car, a construction machine or an industry, a combustion device or the like, a honeycomb catalytic body, and a manufacturing method of the same.

DESCRIPTION OF THE RELATED ART

At present, to purify an exhaust gas discharged from each of various types of engines or the like, a catalytic body having a honeycomb structure (a honeycomb catalytic body) is used. This honeycomb catalytic body has a structure in which the surfaces of partition walls forming cells carry catalyst layers. Moreover, when the exhaust gas is purified using this honeycomb catalytic body (the honeycomb structure), the exhaust gas is allowed to flow into the cells of the honeycomb catalytic body from the side of one end face, so that it comes in contact with the catalyst layers on the surfaces of the partition walls, and then the thus purified gas is discharged from the side of the other end face to the outside (e.g., see Patent Document 1).

When the exhaust gas is purified using such a honeycomb catalytic body, transmission of components to be removed from the exhaust gas to the catalyst layers on the surfaces of the partition walls needs to be promoted as much as possible to improve a purification efficiency. To improve the exhaust gas purification efficiency, the cell hydraulic diameters of the cells need to be decreased, and the surface areas of the partition walls need to be enlarged. Specifically, there is employed a method of increasing the number of the cells per unit area (a cell density) or the like.

Here, it is known that the transmissibility of the components to be removed from the exhaust gas to the catalyst layers on the surfaces of the partition walls increases in inverse proportion to the square of each cell hydraulic diameter. Therefore, when the cell density is increased, the transmissibility of the components to be removed improves. However, a pressure loss also tends to increase in inverse proportion to the square of the cell hydraulic diameter. In consequence, there is a problem that with the improvement of the transmissibility of the components to be removed, the pressure loss increases.

It is to be noted that the catalyst layers on the surfaces of the partition walls usually have thicknesses of about several ten μm. Here, in a case where the components to be removed diffuse in the catalyst layers at an insufficient speed, the purification efficiency of the honeycomb catalytic body tends to lower. This tendency is remarkably recognized especially on low-temperature conditions. Therefore, to improve the purification efficiency of the exhaust gas, not only the increasing of the surface areas of the catalyst layers but also the decreasing of the thicknesses of the catalyst layers need to be performed to increase the diffusion speed of the components to be removed in the catalyst layers. In consequence, there is an advantage that when the cell density is increased, the surface areas of the catalyst layers increase, but there is still a problem that the pressure loss increases.

To decrease the pressure loss while increasing the purification efficiency of the exhaust gas, the inflow diameter of the honeycomb catalytic body needs to be increased, and the flow rate of the exhaust gas to be circulated needs to be decreased. However, in case of the enlargement of the honeycomb catalytic body or the like, there is a restriction on, for example, the mounting space of the honeycomb catalytic body to be mounted on a car or the like, and it is therefore sometimes difficult to mount the honeycomb catalytic body.

[Patent Document 1] Japanese Patent Application Laid-Open No. 2003-33664

The present invention has been developed in view of such problems of conventional technologies, and an object thereof is to provide a honeycomb structure capable of providing a honeycomb catalytic body which is excellent in purification efficiency and which has an only small pressure loss and which can be mounted even in a limited space, a honeycomb catalytic body which is excellent in purification efficiency and which has an only small pressure loss and which can be mounted even in a limited space, and a manufacturing method of the same.

SUMMARY OF THE INVENTION

As a result of intensive investigation for achieving the above object, the present inventors have found that the permeability of partition walls constituting a honeycomb structure can be set to a specific numeric range to achieve the above object, and have completed the present invention. That is, according to the present invention, a honeycomb structure, a honeycomb catalytic body and a manufacturing method of the same are provided as follows.

[1] A honeycomb structure of a flow-through type through which cells as through channels extend from an inlet to an outlet, wherein cells as through flow channels are defined by partition walls having pores which communicate from a surface on one cell side to a surface on another cell side, and the partition walls have a permeability of $1.5 \times 10^{-12}$ [$m^2$] or more.

[2] The honeycomb structure according to [1], wherein a cell hydraulic diameter of a cell varies between the inlet and the outlet, and cells adjacent each other have different cell hydraulic diameters in at least a part of the honeycomb structure.

[3] The honeycomb structure according to [1] or [2], wherein the cells are arranged so as to dispose adjacently each other a cell having a cell hydraulic diameter of an outlet end face being smaller than that of an inlet end face, and a cell having the cell hydraulic diameter of an outlet end face being larger than that of an inlet end face.

[4] The honeycomb structure according to [1], wherein the surfaces of the partition walls have a plurality of protruding portions or regions having different surface roughnesses.

[5] The honeycomb structure according to [4], wherein the protruding portions or the regions having the different surface roughnesses are arranged alternately at intervals of 3 mm or more and 40 mm or less on the surfaces of the partition walls in a direction along the cells as through channels.

[6] The honeycomb structure according to [4], wherein the protruding portions on the surfaces of the partition walls have widths of 1 mm or more and 10 mm or less, and have heights in excess of 0.1 mm in the direction along the cells as through channels.

[7] The honeycomb structure according to [1], wherein the partition walls twist and curve in a range of 1 to 9°/cm per honeycomb structure length in a rotating direction around the central axis from one end forming the inlet to the other end forming the outlet so as to prevent a fluid from flowing straightly through the cells.

[8] The honeycomb structure according to any one of [1] to [7], wherein a cell density is in a range of 40 cells/cm² or more and less than 100 cells/cm², and partition wall thicknesses are in a range of 50 μm or more and less than 200 μm.

[9] A honeycomb catalytic body of a flow-through type through which cells as through channels extend from an inlet to an outlet, wherein cells as through flow channels are defined by partition walls having pores which communicate from a surface on one cell side to a surface on another cell side, both surfaces of the partition walls and inner surfaces of the pores carry a catalyst, and the partition walls after catalyst carrying have a permeability of $1\times10^{-12}$ [m²] or more.

[10] The honeycomb catalytic body according to [9], wherein a cell hydraulic diameter of a cell varies between the inlet and the outlet, and cells adjacent each other have different cell hydraulic diameters in at least a part of the honeycomb structure.

[11] The honeycomb catalytic body according to [9] or [10], wherein the cells are arranged so as to dispose adjacently each other a cell having a cell hydraulic diameter of an outlet end face being smaller than that of an inlet end face, and a cell having the cell hydraulic diameter of an outlet end face being larger than that of an inlet end face.

[12] The honeycomb catalytic body according to [9], wherein the surfaces of the partition walls have a plurality of protruding portions or regions having different surface roughnesses.

[13] The honeycomb catalytic body according to [12], wherein the protruding portions or the regions having the different surface roughnesses are arranged alternately at intervals of 3 mm or more and 40 mm or less on the surfaces of the partition walls in a direction along the cells as through channels.

[14] The honeycomb catalytic body according to [12], wherein the protruding portions on the surfaces of the partition walls have widths of 1 mm or more and 10 mm or less, and have heights in excess of 0.1 mm in the direction along the cells as through channels.

[15] The honeycomb catalytic body according to [9], wherein the partition walls twist and curve in a range of 1 to 9°/cm per honeycomb catalytic body length in a rotating direction around the central axis from one end forming the inlet to the other end forming the outlet so as to prevent a fluid from flowing straightly through the cells.

[16] The honeycomb catalytic body according to any one of [9] to [15], wherein a cell density is in a range of 40 cells/cm² or more and less than 100 cells/cm², and partition wall thicknesses are in a range of 50 μm or more and less than 200 μm.

[17] The honeycomb catalytic body according to any one of [9] to [16], wherein the catalyst is a gasoline engine exhaust gas purifying ternary catalyst including a carrier coat made of active alumina, one or more noble metals selected from the group consisting of Pt, Rh and Pd and dispersed and carried in the carrier coat, and one or more compounds selected from the group consisting of cerium oxide, zirconia oxide and silica and contained in the carrier coat.

[18] The honeycomb catalytic body according to any one of [9] to [16], wherein the catalyst is an oxidation catalyst containing one or more noble metals selected from the group consisting of Pt, Rh and Pd for purifying an exhaust gas from a gasoline engine or a diesel engine.

[19] The honeycomb catalytic body according to any one of [9] to [16], wherein the catalyst is an SCR catalyst for $NO_x$ selective reduction containing at least one selected from the group consisting of metal-substituted zeolite, vanadium, titania, tungsten oxide, silver and alumina.

[20] The honeycomb catalytic body according to any one of [9] to [16], wherein the catalyst is an $NO_x$ occluding catalyst containing an alkali metal and/or an alkali earth metal.

[21] A manufacturing method of the honeycomb catalytic body according to any one of [9] to [20], wherein before carrying the catalyst on the inner surfaces of the pores of the partition walls of the flow-through type honeycomb structure through which the cells as through channels extend from the inlet to the outlet, at least the inner surfaces of the pores of the partition walls are coated with alumina which does not contain any noble metal, and then the catalyst is carried on the coated inner surfaces.

[22] A manufacturing method of the honeycomb structure according to [2] or [3], comprising the steps of forming a honeycomb article having the formed cells and having plasticity; using a cell shape reforming jig including a plurality of protrusions tapered toward a tip thereof and having a function of optically measuring the arrangement of the cells of the formed honeycomb article to align the protruding positions of the protrusions with the cells; inserting the protrusions of the cell shape reforming jig into the cells of the formed honeycomb article from both end face sides thereof to change the cell hydraulic diameters; and firing the formed honeycomb article.

[23] A manufacturing method of the honeycomb structure according to any one of [4] to [6], wherein the formed honeycomb article having the formed cells and having plasticity is directed so that the axial direction thereof is a gravity direction, and immersed into water a plurality of times to varied immersion depths in the cells, and in each water immersion step, while a sheet having openings in positions corresponding to at least a part of the cells is attached to the upper end face of the formed honeycomb article, solid particles capable of forming a slurry when dissolved in water and having diameters smaller than cell diameters are sprinkled from the upside of the sheet, and the solid particles drop down through the cells, reach the water, adhere as the slurry to the partition walls to form the protruding portions, followed by drying and firing the formed honeycomb article.

[24] A manufacturing method of the honeycomb structure according to any one of [4] to [6], comprising the steps of forming divided honeycomb articles having the formed cells, having plasticity and having lengths obtained by dividing an intended final length into a plurality of lengths; attaching, to the end faces of the divided honeycomb articles, a sheet having openings only corresponding to the cells to be provided with the protruding portions; partially immersing the divided honeycomb articles into a honeycomb material slurry while the end faces having the attached sheet are directed downwards, to increase partition wall thicknesses, thereby forming the protruding portions; joining the divided honeycomb articles together in series to obtain the intended length; and drying and firing the joined honeycomb article.

[25] A manufacturing method of the honeycomb structure according to any one of [4] to [6], comprising the steps of forming divided honeycomb articles having the formed cells, having plasticity and having lengths obtained by dividing an intended final length into a plurality of lengths; attaching, to the end faces of the divided honeycomb articles, a sheet having openings only corresponding to the cells to be provided with the regions having the different surface roughnesses; coating the face of the sheet with a honeycomb material slurry blended with particles having particle diameters different from those of a raw material of main bodies of the divided honeycomb articles to form regions having different surface states; joining the divided honeycomb articles together in series to form the intended length; and drying and firing the joined honeycomb article.

The honeycomb structure of the present invention produces an effect that there can be provided a honeycomb catalytic body which is excellent in purification efficiency and which has an only small pressure loss and which can be mounted even in a limited space. Moreover, there is produced an effect that the honeycomb catalytic body of the present invention carrying the catalyst is excellent in purification efficiency, has an only small pressure loss and can be mounted even in a limited space.

BRIEF DESCRIPTION OF THE DRAWINGS

FIG. 2 shows a sectional view schematically showing the embodiment of the honeycomb structure and the honeycomb catalytic body of the present invention and a partially enlarged view of partition walls;

DESCRIPTION OF REFERENCE NUMERALS

1 . . . honeycomb structure, 1a . . . formed honeycomb article, 1b . . . divided honeycomb article, 2a . . . inlet end face, 2b . . . outlet end face, 3 . . . cell, 4 . . . partition wall, 5 . . . catalyst layer, 11 . . . protruding portion, 12 . . . region having each of different surface roughnesses, 15 . . . honeycomb material slurry, 16 . . . honeycomb material slurry, 17 . . . solid particle, 20 . . . outer wall, 25 . . . pore, 30 . . . cell shape reforming jig, 31 . . . protrusion, 32 . . . positioning plate, 35 . . . sheet, 40 . . . outer periphery holding jig, 41 . . . water tank, 50 . . . honeycomb catalytic body, 61, 62 . . . grasping tool, 100 . . . test piece, 105 . . . remaining rib, D . . . cell hydraulic diameter, T . . . partition wall thickness (rib thickness), η . . . rotated angle.

BEST MODE FOR CARRYING OUT THE INVENTION

Hereinafter, embodiments of the present invention will be described with reference to the drawings. The present invention is not limited to the following embodiments, and can be altered, modified or improved without departing from the scope of the present invention.

Embodiment 1

Figure 1:
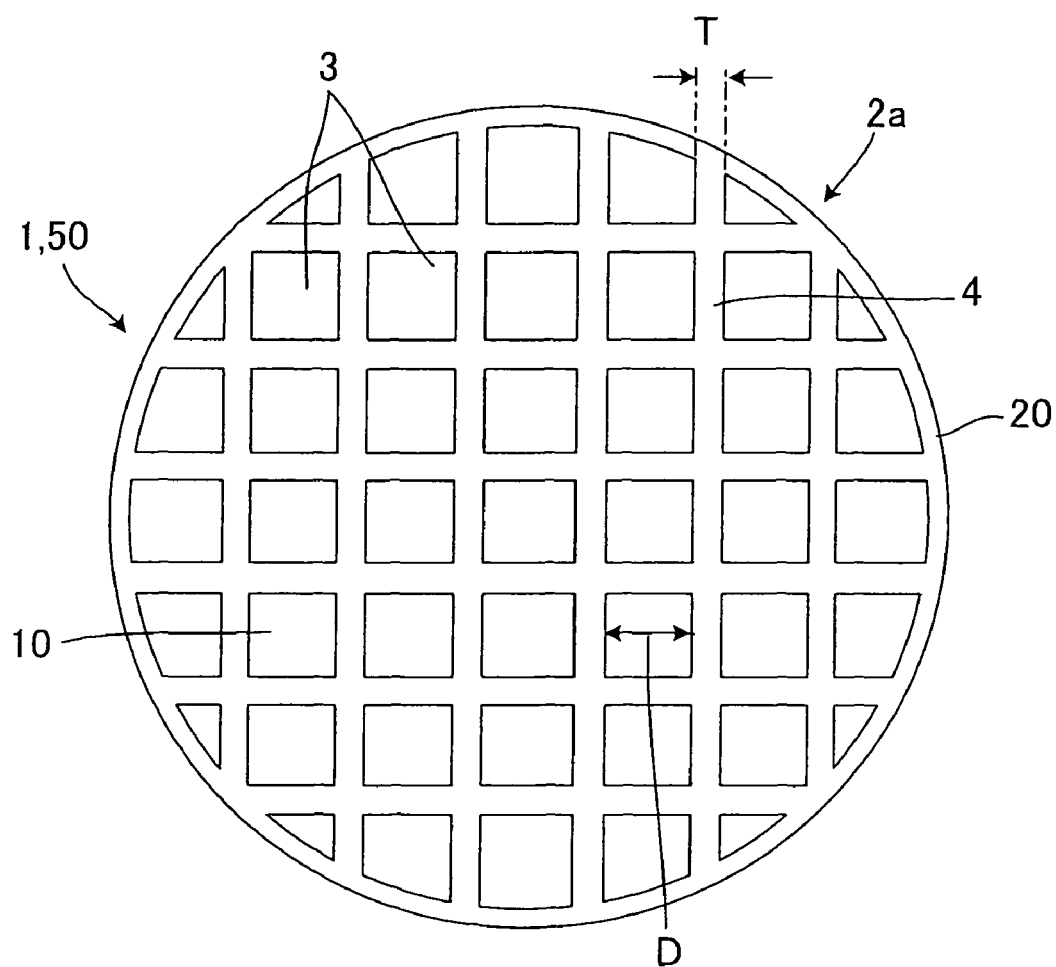
FIG. 1 is a front view schematically showing one embodiment of a honeycomb structure and a honeycomb catalytic body of the present invention.

FIG. 1 is a front view schematically showing one embodiment of a honeycomb structure and a honeycomb catalytic body of the present invention. Moreover, FIG. 2 is a sectional view schematically showing the embodiment of the honeycomb structure and the honeycomb catalytic body of the present invention. As shown in FIGS. 1, 2, a honeycomb structure 1 of the present embodiment includes porous partition walls 4 having a large number of pores. The partition walls 4 are arranged so as to form a plurality of cells 3 which communicates between two end faces (an inlet end face 2a, an outlet end face 2b) to each other. It is to be noted that in FIG. 1, reference numeral 20 is an outer wall, symbol D is a cell hydraulic diameter, and T is a partition wall thickness (a rib thickness), respectively.

The honeycomb structure 1 of the present invention is a flow-through type honeycomb structure through which cells as through channels extend from an inlet to an outlet, the cells as through channels are formed by the partition walls 4 having pores 25 which communicate the surface on one cell side to the surface on the opposite cell side, and the partition walls 4 have a permeability of $1.5 \times 10^{-12}$ [m$^2$] or more. Moreover, the permeability is preferably $1 \times 10^{-9}$ [m$^2$] or less. Furthermore, in a honeycomb catalytic body 50 of the present invention, as shown in an enlarged view of FIG. 2, a catalyst is carried by both the surfaces of the partition walls 4 of the honeycomb structure 1 and the inner surfaces of the pores 25 to form catalyst layers 5, and the catalyst carrying partition walls have a permeability of $1 \times 10^{-12}$ [m$^2$] or more. Moreover, the permeability is preferably $1 \times 10^{-9}$ [m$^2$] or less. When the permeability of the partition walls 4 is less than $1 \times 10^{-12}$ m$^2$, a pressure loss increases, and the pressure loss in a case where the honeycomb catalytic body is used for a long period tends to easily increase. On the other hand, when the permeability of the partition walls 4 exceeds $1 \times 10^{-9}$ [m$^2$], there is a tendency that a sufficient contact area between an exhaust gas and the catalyst layers 5 cannot easily be secured.

Figure 13:
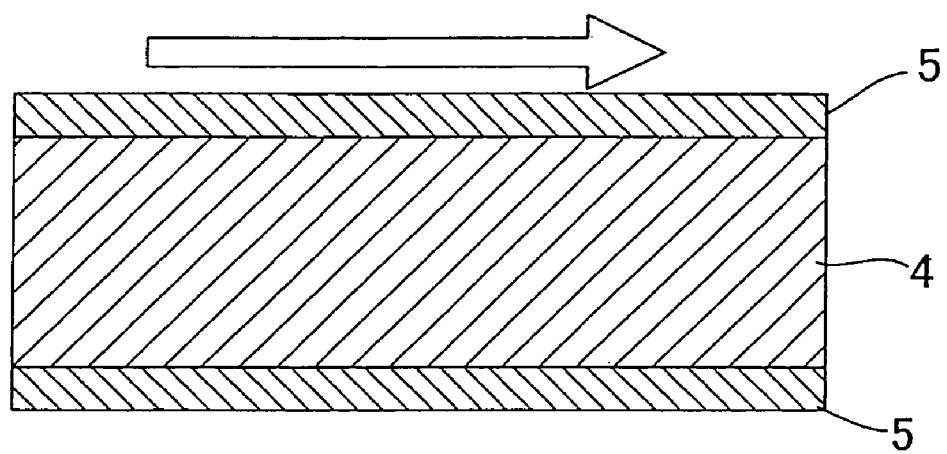
FIG. 13 is a partially enlarged view of partition walls of a conventional honeycomb catalytic body.

When the permeability is set to such a range, as shown in the enlarged view of FIG. 2, the exhaust gas easily passes through the partition walls 4, and carbon fine particles included in the exhaust gas and the like are hardly collected. On the other hand, in a conventional honeycomb catalytic body shown in FIG. 13, the exhaust gas does not easily pass through the partition walls 4, and the honeycomb catalytic body does not have a satisfactory purification efficiency. The honeycomb catalytic body 50 of the present invention has an only small pressure loss, and the pressure loss does not easily increase even when the honeycomb catalytic body is used for a long period. Moreover, since the inner surfaces of the partition walls 4 also carry the catalyst, there can be provided the compact honeycomb catalytic body 50 which is excellent in purification efficiency as compared with the conventional honeycomb catalytic body and which can be mounted even in a limited space.

It is to be noted that "the permeability" mentioned in the present specification is a physical value calculated by the following equation (1) and is an index indicating a passage resistance in a case where a predetermined gas passes through the corresponding object (each partition wall). Here, in the following equation (1), C is the permeability ($m^2$), F is a gas flow-rate ($cm^3/s$), T is a sample thickness (cm), V is a gas viscosity (dynes·sec/$cm^2$), D is a sample diameter (cm), and P is a gas pressure (PSI), respectively. Moreover, numeric values in the following equation (1) are 13.839 (PSI)=1 (atm), and 68947.6 (dynes·sec/$cm^2$)=1 (PSI).

$$C = \frac{8FTV}{\pi D^2 (P^2 - 13.839^2)/13.839 \times 68947.6} \times 10^{-4} \quad (1)$$

Figure 11:
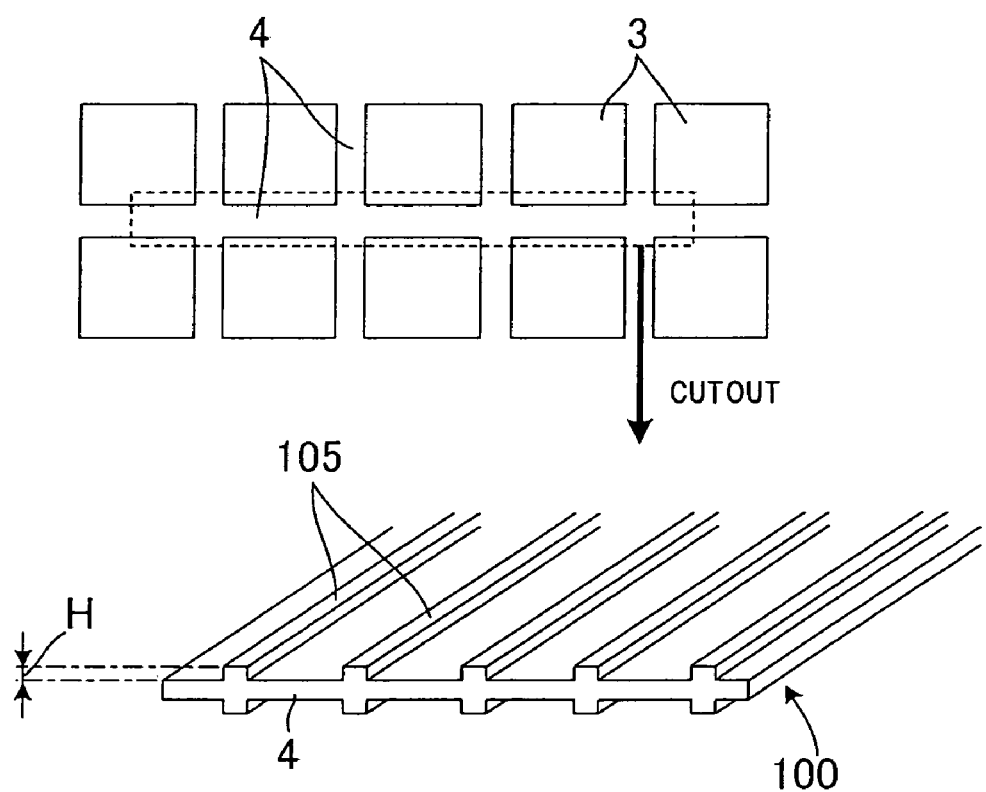
FIG. 11 is a schematic diagram explaining a test piece for use in measurement of a permeability.

As a measurement procedure of the permeability, in the case of the honeycomb structure or the honeycomb catalytic body, as shown in FIG. 11, air at room temperature is allowed to pass through a plate obtained by cutting one partition wall so as to obtain a remaining rib height H of 0.2 mm or less, or the partition wall 4 of a disc-like test piece 100, and the passage resistance during the passing is measured to obtain the permeability by the equation (1). In this case, a fluid seal such as a grease is preferably used together so that any air does not leak from a space between the partition wall and a seal formed by remaining ribs 105. Moreover, as an air flow rate range is used a measurement result in a range in which a calculated partition wall passage flow rate is 0.1 cm/sec or more and 1 cm/sec or less. In the honeycomb catalytic body, a degree of formation of a catalyst coat layer on each cell inner wall face is different from that on each cut rib section, but the present invention adopts a configuration in which the inner surfaces of the pores in the partition walls are coated with a large amount of the catalyst, so that the remaining ribs have less influence, and the permeability of the partition walls of the honeycomb catalytic body can be measured by the same measurement method as that of the honeycomb structure.

First, the honeycomb structure 1 which does not carry any catalyst will be described. Preferable examples of a material constituting the honeycomb structure 1 of the present embodiment include a material including a ceramic material as a main component, and a sintered metal. Moreover, when the honeycomb structure 1 of the present embodiment is constituted of a material including the ceramic material as the main component, preferable examples of this ceramic material include silicon carbide, cordierite, alumina titanate, sialon, mullite, silicon nitride, zirconium phosphate, zirconia, titania, alumina, silica and a combination of them. In particular, ceramic materials such as silicon carbide, cordierite, mullite, silicon nitride and alumina preferably have alkali-resistant characteristics. Above all, an oxide-based ceramic material is also preferable from the viewpoint of cost.

The honeycomb structure 1 of the present embodiment has a thermal expansion coefficient preferably less than $1.0 \times 10^{-6}/°C$. at 40 to 800°C. in the follow through direction of the cells, further preferably less than $0.8 \times 10^{-6}/°C$., especially preferably less than $0.5 \times 10^{-6}/°C$. When the thermal expansion coefficient at 40 to 800°C. in follow through direction of the cells is less than $1.0 \times 10^{-6}/°C$., a thermal stress generated in a case where the honeycomb structure is exposed to the exhaust gas at a high temperature is suppressed in an allowable range, and the honeycomb structure can be prevented from being broken by the thermal stress.

Moreover, the shape of the section of the honeycomb structure 1 of the present embodiment cut along the face of the honeycomb structure vertical to follow through direction of the cells in a diametric direction is preferably a shape adapted to the inner shape of an exhaust system to be installed. Specific examples of the shape include a circle, an ellipse, an oval, a trapezoidal shape, a triangular shape, a quadrangular shape, a hexagonal shape and a horizontally asymmetric irregular shape. Above all, the circle, the ellipse and the oval are preferable.

Furthermore, the honeycomb structure is preferably formed so as to obtain a cell density of 40 cells/$cm^2$ or more and less than 100 cells/$cm^2$ and partition wall thicknesses of 50 μm or more and less than 200 μm. When the cell density is less than 40 cells/$cm^2$, a contact efficiency between the cells and the exhaust gas tends to come short. On the other hand, when the cell density exceeds 100 cells/$cm^2$, the pressure loss tends to increase. When the partition wall thicknesses are less than 50 μm, a strength sometimes comes short to lower a resistance to thermal shock. On the other hand, when the partition wall thicknesses exceed 200 μm, the pressure loss tends to increase.

The honeycomb structure 1 of the present invention has the permeability of the partition walls 4 thereof in a predetermined numeric range. Therefore, for example, to appropriately regulate a material chemical composition and obtain a porous structure by use of a pore former, when the type of the pore former for use, particle diameters, an amount of the pore former to be added or the like is appropriately regulated, the permeability of the partition walls 4 can be set to the predetermined numeric range.

In the honeycomb catalytic body of the present invention, the catalyst is carried by both the surfaces of the partition walls of the honeycomb structure 1 and the inner surfaces of the pores to form the catalyst layers. Next, the honeycomb catalytic body 50 will be described.

In a state in which the catalyst layers 5 are carried, that is, the catalyst carrying pores are formed, the partition walls 4 have an average pore diameter of preferably 5 to 100 μm, further preferably 20 to 80 μm, especially preferably in excess of 35 μm and 60 μm or less. When the average pore diameter is less than 5 μm, fine particles such as the carbon fine particles and ashes included in the exhaust gas discharged from an engine are easily collected to close the pores. On the other hand, when the average pore diameter exceeds 100 μm, there is a tendency that the sufficient contact area between the exhaust gas and the catalyst layers is not easily secured.

In the state in which the catalyst layers 5 are carried, that is, the catalyst carrying pores are formed, the partition walls 4 have a porosity of preferably 30 to 80%, further preferably 40 to 65%. When the porosity is less than 30%, pore surface areas come short, and a purification performance tends to deteriorate. On the other hand, when the porosity exceeds 80%, the strength tends to become insufficient.

In the same manner as in the honeycomb structure 1, the cell density is 40 cells/$cm^2$ or more and less than 100 cells/$cm^2$, and the partition wall thicknesses are 50 μm or more and less than 200 μm.

Specific examples of the catalyst contained in the catalyst layers 5 constituting the honeycomb catalytic body 50 of the present embodiment include (1) a gasoline engine exhaust gas purifying ternary catalyst, (2) an oxidation catalyst for purifying an exhaust gas from a gasoline engine or a diesel engine, (3) an SCR catalyst for $NO_x$ selective reduction and (4) an $NO_x$ occluding catalyst.

The gasoline engine exhaust gas purifying ternary catalyst includes a carrier coat which coats the partition walls of the honeycomb structure (a honeycomb carrier), and a noble metal dispersed and carried in this carrier coat. The carrier coat is made of, for example, active alumina. Moreover, preferable examples of the noble metal dispersed and carried in the carrier coat include Pt, Rh, Pd and a combination of them. Furthermore, the carrier coat contains, for example, a compound such as cerium oxide, zirconia oxide or silica, or a mixture of them. It is to be noted that the total amount of the noble metals is preferably set to 0.17 to 7.07 g per liter of the volume of the honeycomb structure.

The oxidation catalyst for purifying the exhaust gas from the gasoline engine or the diesel engine contains the noble metal. As this noble metal, one or more noble metals selected from the group consisting of Pt, Rh and Pd are preferable. It is to be noted that the total amount of the noble metals is preferably set to 0.17 to 7.07 g per liter of the volume of the honeycomb structure. Moreover, the SCR catalyst for $NO_x$ selective reduction contains at least one selected from the group consisting of metal-substituted zeolite, vanadium, titania, tungsten oxide, silver and alumina.

The $NO_x$ occluding catalyst contains an alkali metal and/or an alkali earth metal. Examples of the alkali metal include K, Na and Li. Examples of the alkali earth metal include Ca. It is to be noted that the total amount of K, Na, Li and Ca is preferably set to 5 g or more per liter of the volume of the honeycomb structure.

The honeycomb catalytic body 50 of the present invention can be manufactured by carrying the catalyst on the above honeycomb structure 1 by a manufacturing method conforming to a heretofore known method. Specifically, first a catalyst slurry containing the catalyst is prepared. Subsequently, the surfaces of the pores of the partition walls 4 of the honeycomb structure 1 are coated with this catalyst slurry by a method such as a suction process. Afterward, the structure can be dried at room temperature or on heating conditions to manufacture the honeycomb catalytic body 50 of the present invention.

Moreover, before carrying the catalyst on the inner surfaces of the pores 25 of the partition walls 4 of the honeycomb structure 1, at least the inner surfaces of the pores 25 of the partition walls 4 are coated with alumina which does not contain any noble metal, and then the catalyst may be carried. Such alumina coating can be performed to close considerably small pores which do not easily receive any gas and to preferentially coat, with the catalyst, large pores which easily come in contact with the gas.

Next, different Embodiments 2 to 5 of the honeycomb structure 1 and the honeycomb catalytic body 50 will be described. It is to be noted that details of the material of a main body of the honeycomb structure 1, the catalyst, the permeability, the cell density, the partition wall thicknesses and the like are similar to those of Embodiment 1.

Embodiments 2, 3

Figure 3:
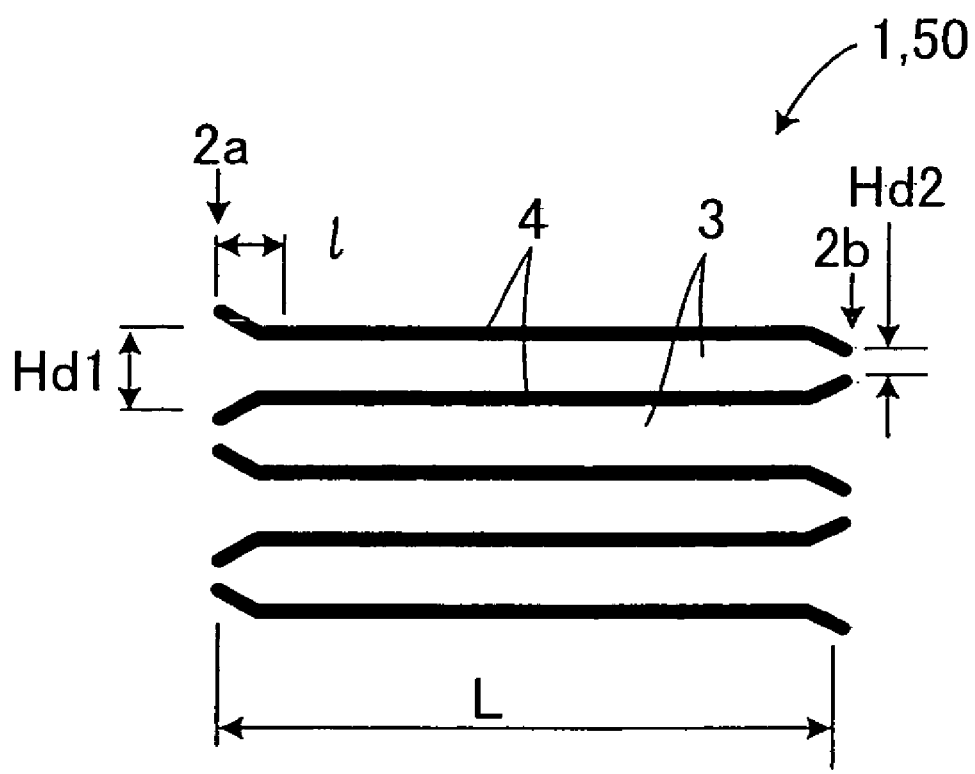
FIG. 3 is a schematic diagram schematically showing Embodiment 2 of the honeycomb structure and the honeycomb catalytic body of the present invention.
Figure 4:
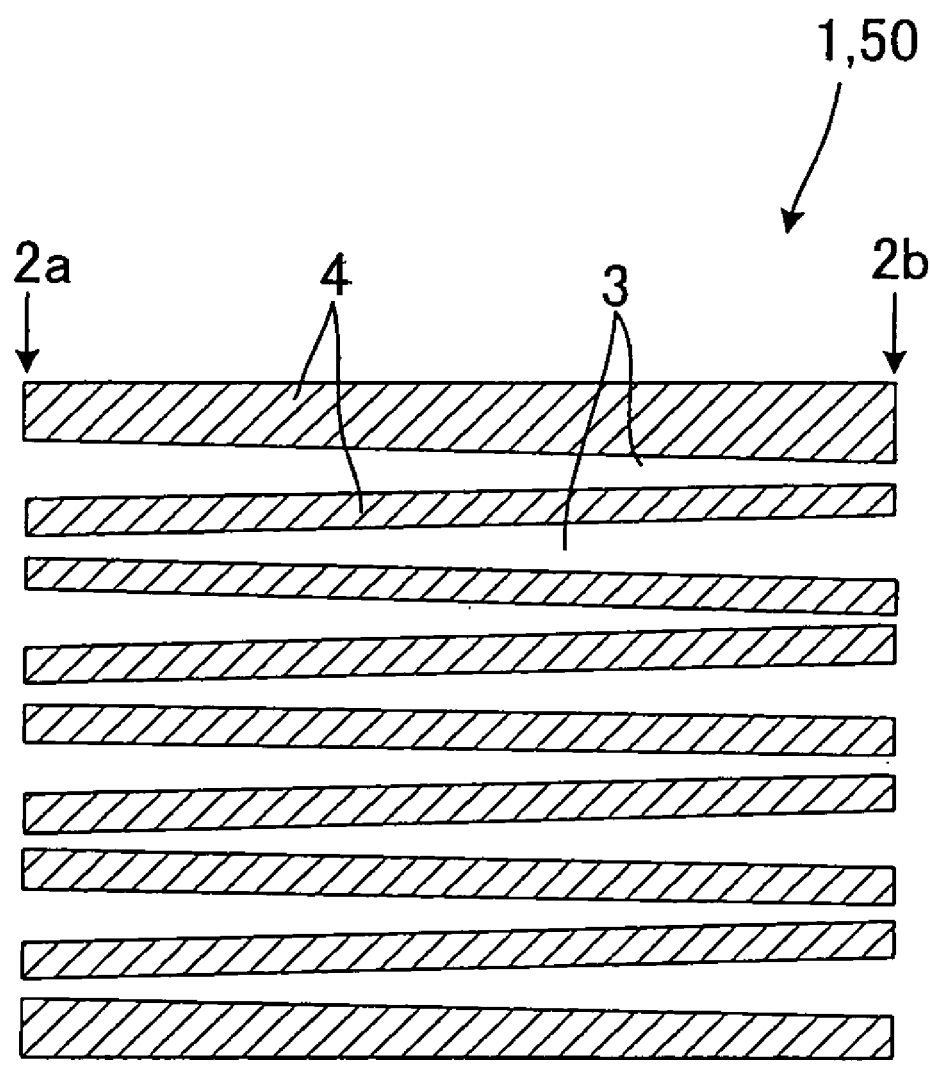
FIG. 4 is a schematic diagram schematically showing Embodiment 3 of the honeycomb structure and the honeycomb catalytic body of the present invention.

Honeycomb structures 1 of Embodiments 2 and 3 have a constitution in which as shown in FIG. 3 (Embodiment 2) and FIG. 4 (Embodiment 3), cell hydraulic diameters change between an inlet and an outlet, and at least a part of the honeycomb structure has a portion in which adjacent cells have different cell hydraulic diameters. The cells are arranged so that the cell having the cell hydraulic diameter of an outlet end face which is smaller than that of an inlet end face is disposed adjacent to the cell having the cell hydraulic diameter of an outlet end face which is larger than that of an inlet end face.

As shown in FIG. 3, the honeycomb structure 1 of Embodiment 2 is formed so that the cell hydraulic diameters of regions in the vicinity of both end faces 2a, 2b are enlarged or reduced in a tapered manner. Moreover, as shown in FIG. 4, the honeycomb structure 1 of Embodiment 3 is formed so that the cell hydraulic diameters gradually change between an inlet end face 2a and an outlet end face 2b. When the structure is formed in this manner, a contact area between an exhaust gas and catalyst layers 5 can be enlarged to form a compact honeycomb catalytic body 50 which is more excellent in purification efficiency and which can be mounted even in a limited space.

Figure 5A:
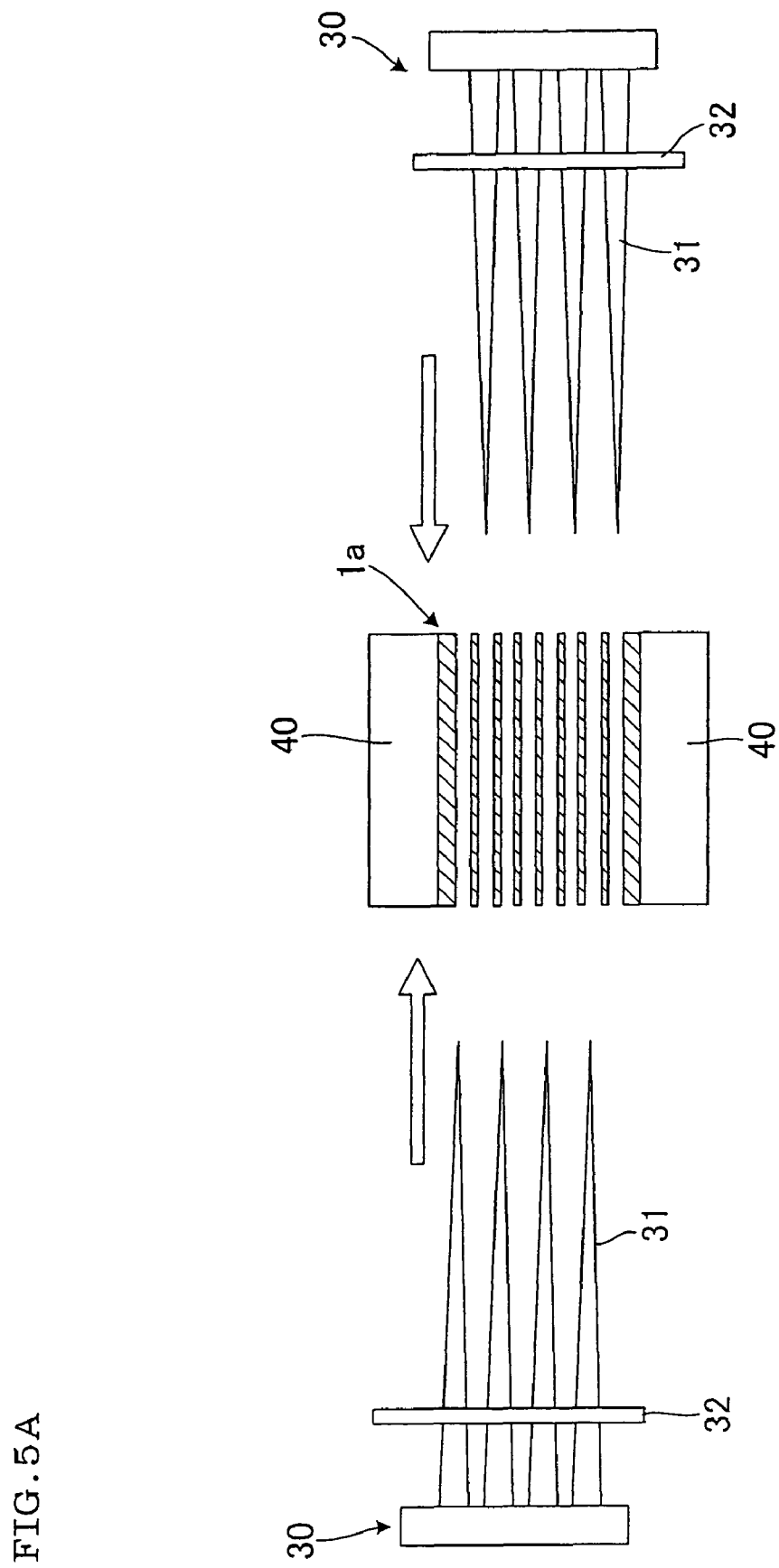
FIG. 5A is an explanatory view showing a manufacturing method of the honeycomb structure of Embodiment 3.

Next, a manufacturing method of the honeycomb structure 1 of Embodiment 3 will be described with reference to FIGS. 5A and 5B. It is to be noted that the shape of a jig shown in the drawings can be changed to similarly manufacture the honeycomb structure 1 of Embodiment 2.

First, for example, a substantially cylindrical formed honeycomb article 1a constituted of cells with the same shape and an equal size and having plasticity is formed (it is to be noted that the shape of each cell 3 or the main body of the honeycomb structure 1 is not limited to this shape). Next, as shown in FIG. 5A, the formed honeycomb article 1a is set in outer periphery holding jigs 40 which come in contact with the cylindrical outer peripheral surface of the formed honeycomb article 1a to fix the formed honeycomb article, and the cell shapes are reformed using cell shape reforming jigs 30 for reforming the cell shapes. The cell shape reforming jigs 30 have a large number of protrusions 31 tapered toward tips thereof, and have a function of measuring arrangement of the cells 3 of the formed honeycomb article 1a by optical measurement to align protruding positions of the protrusions 31 in accordance with this measured arrangement. Specifically, each cell shape reforming jig 30 includes a light emission device and a light receiving sensor, and these jigs are scanned in a plane parallel to the end faces 2a, 2b of the formed honeycomb article 1a to recognize the positional coordinates of spaces (the cells 3) and partition walls 4 by the presence of reflection, thereby calculating the central coordinate of each cell 3 from this data. Furthermore, each cell shape reforming jig 30 further includes a screw mechanism driven by an electromotive motor, and the position of the cell shape reforming jig 30 is moved in parallel with the end faces 2a, 2b of the formed honeycomb article 1a so that the center of each protrusion 31 of the pointed jig comes to a position where the protrusion is inserted into the cell 3, thereby correcting the position.

Figure 5B:
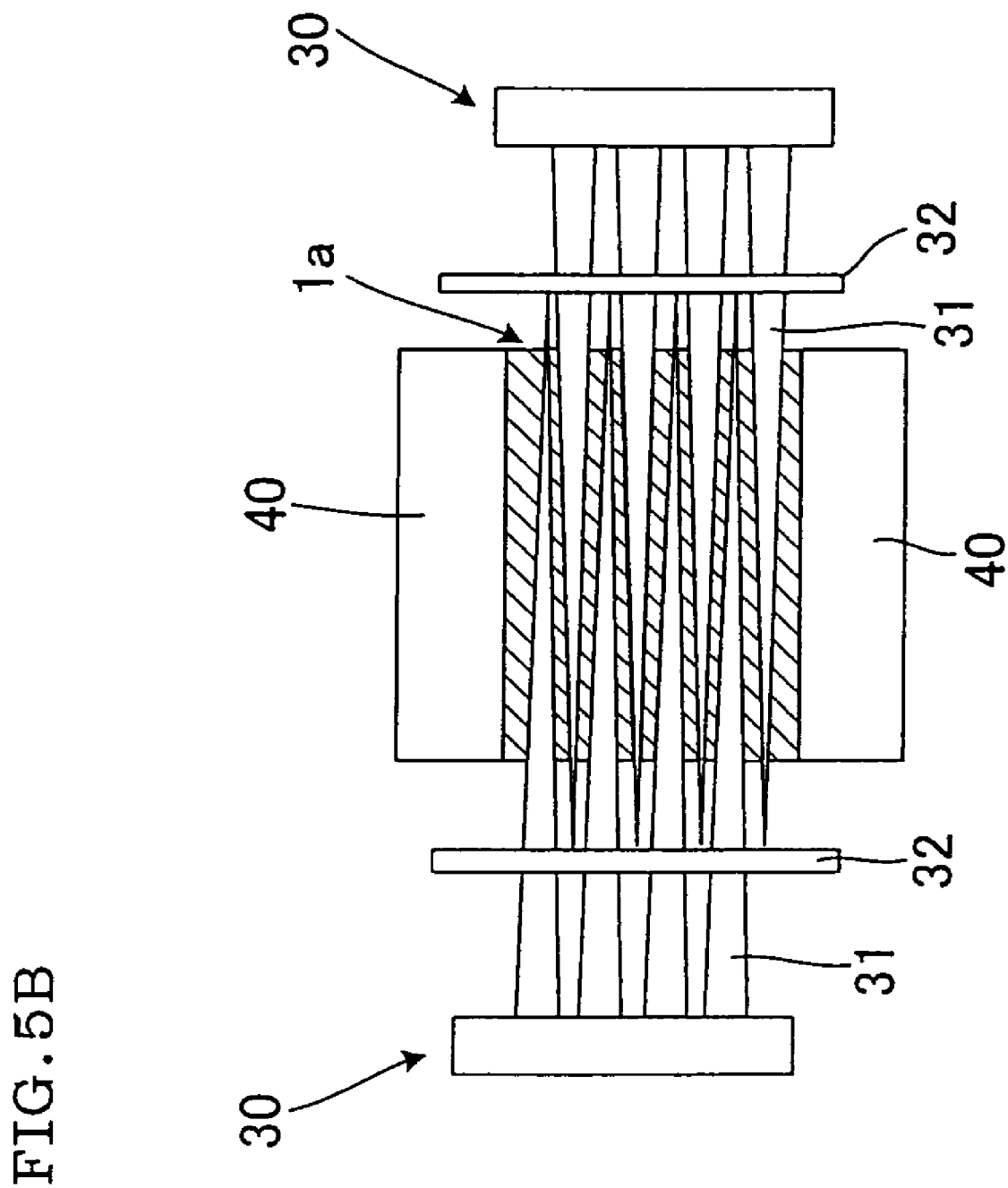
FIG. 5B is an explanatory view following FIG. 5A and explaining the manufacturing method of the honeycomb structure of Embodiment 3.

As shown in FIG. 5B, the protrusions 31 of the cell shape reforming jigs 30 are inserted into the cells 3 from both end faces 2a, 2b sides of the formed honeycomb article 1a set in the outer periphery holding jigs 40, to change the cell hydraulic diameters. Afterward, the formed honeycomb article 1a is fired to obtain the honeycomb structure 1. A catalyst is carried by this honeycomb structure 1 to obtain the honeycomb catalytic body 50.

Embodiments 4, 5

Figure 6:
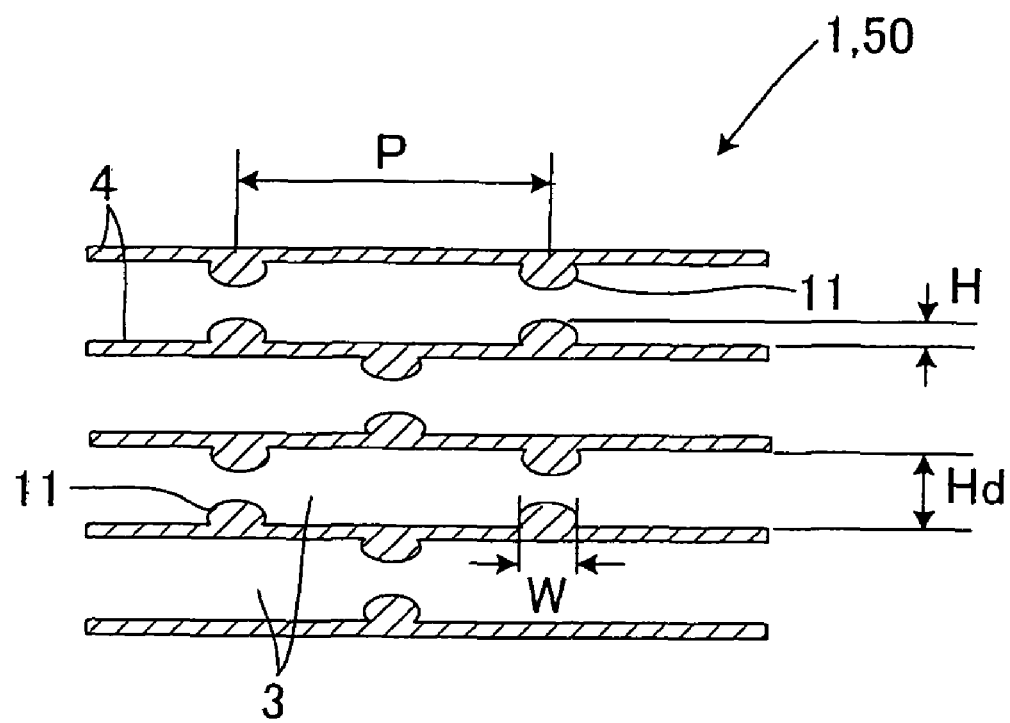
FIG. 6 is a schematic diagram schematically showing Embodiment 4 of the honeycomb structure and the honeycomb catalytic body of the present invention.
Figure 9:
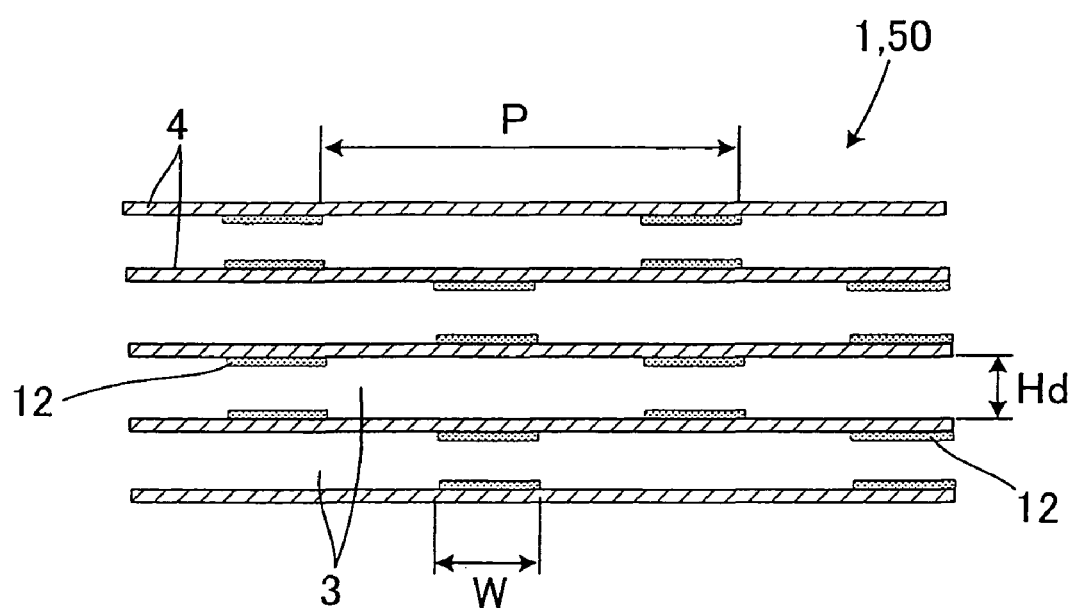
FIG. 9 is a schematic diagram schematically showing Embodiment 5 of the honeycomb structure and the honeycomb catalytic body of the present invention.

A honeycomb structure 1 of the present invention has a constitution in which as shown in FIG. 6 (Embodiment 4) and FIG. 9 (Embodiment 5), the surfaces of partition walls 4 regularly or randomly have a plurality of protruding portions 11 or regions 12 having different surface roughnesses. The protruding portions 11 or the regions 12 having different surface roughnesses are formed at arrangement intervals P of 3 mm or more and 40 mm or less in a direction along the cells as through channels.

In Embodiment 4 shown in FIG. 6, the protruding portions 11 arranged on the surfaces of the partition walls 4 are preferably formed to have widths W of 1 mm or more and 10 mm or less in a direction along the cells as through channels, and heights H in excess of 0.1 mm. When the protruding portions are formed in this manner, a contact area between an exhaust gas and catalyst layers 5 can be enlarged to form a compact honeycomb catalytic body 50 which is more excellent in purification efficiency and which can be mounted even in a limited space.

Figure 7:
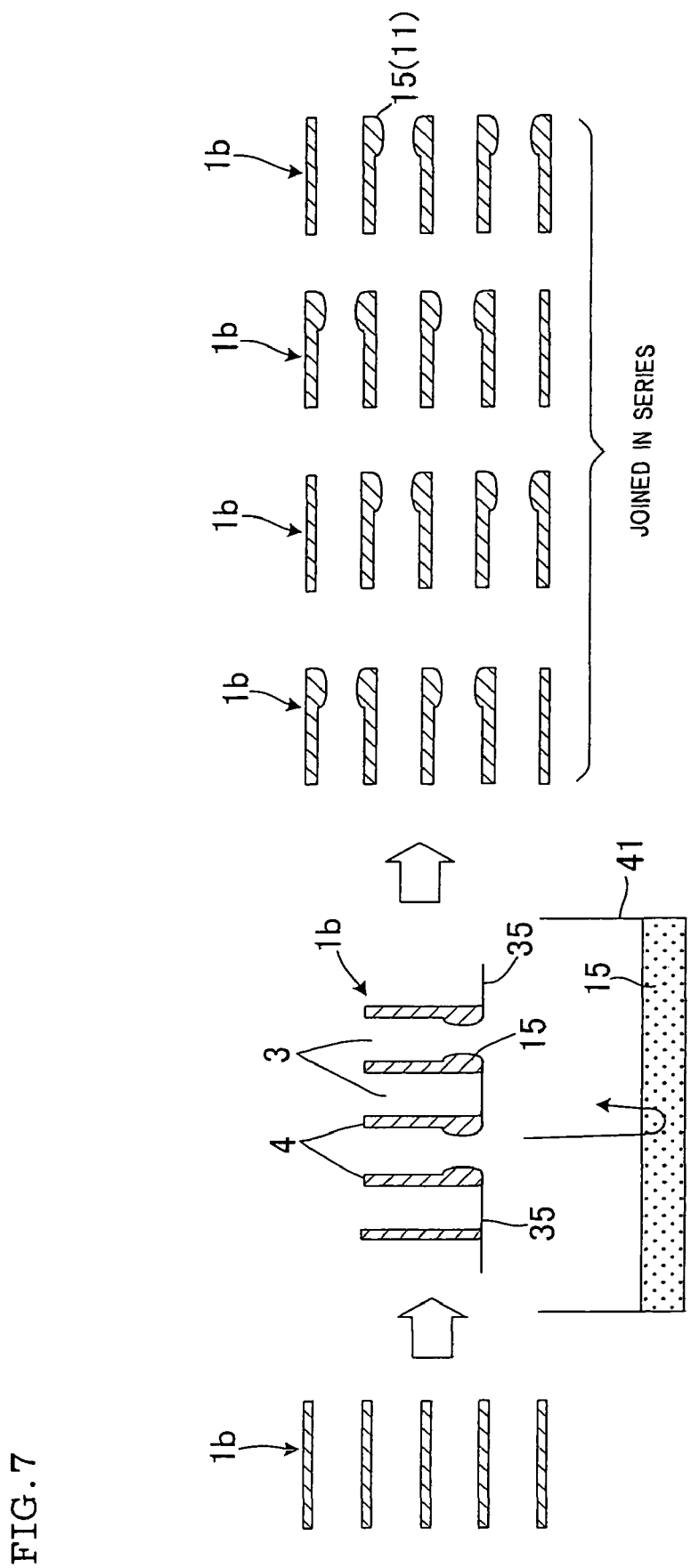
FIG. 7 is an explanatory view explaining a manufacturing method of the honeycomb structure of Embodiment 4.

Next, a manufacturing method of the honeycomb structure 1 of Embodiment 4 will be described with reference to FIG. 7. First, for example, substantially cylindrical divided honeycomb articles 1b constituted of cells with the same shape and an equal size and having plasticity are formed, the articles each having a length obtained by dividing an intended final length (it is to be noted that the shape of each cell 3 or the main body of the honeycomb structure 1 is not limited to this example). Next, a honeycomb material slurry 15 is put in a water tank 41 or the like, a sheet 35 having openings only corresponding to cells to be provided with the protruding portions 11 is attached to the end face of each divided honeycomb article 1b, the face of the article to which the sheet 35 has been attached is directed downwards, and the formed honeycomb article 1b is partially immersed into the honeycomb material slurry 15 to increase partition wall thicknesses, thereby forming the protruding portions 11. Afterward, the divided honeycomb articles 1b are joined in series so as to obtain the intended length, followed by drying and firing, thereby obtaining the honeycomb structure 1.

Figure 8:
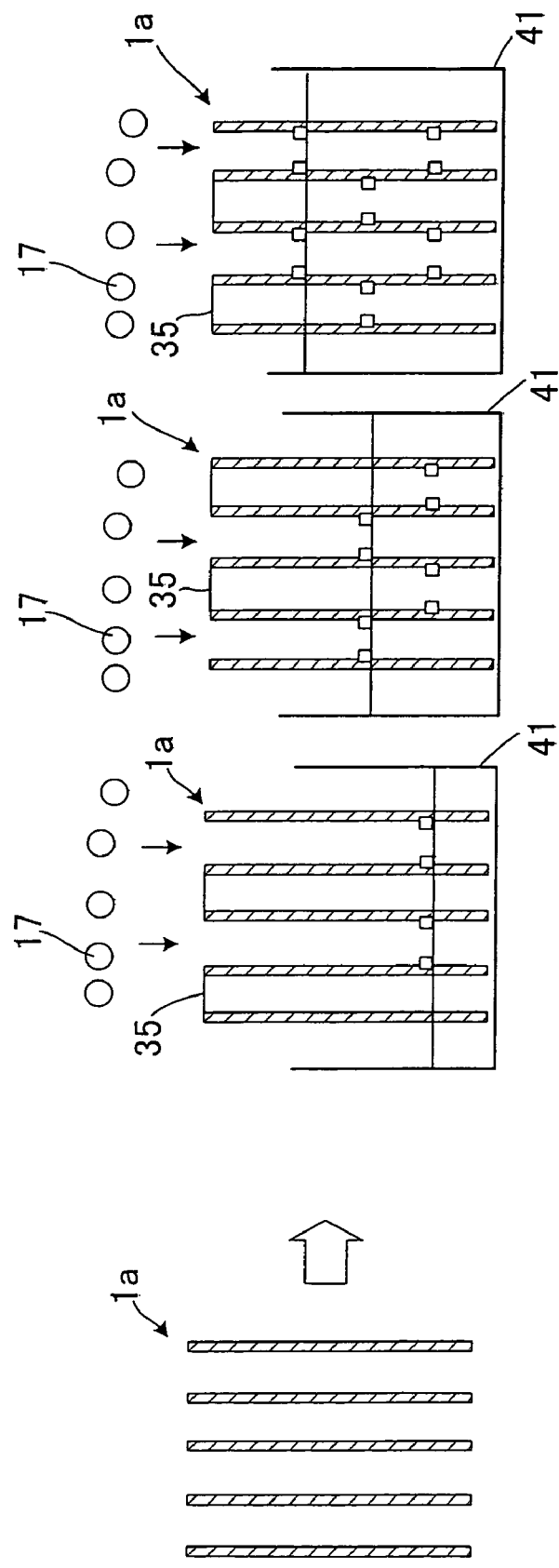
FIG. 8 is an explanatory view showing another manufacturing method of the honeycomb structure of Embodiment 4.

Next, another manufacturing method of the honeycomb structure 1 of Embodiment 4 will be described with reference to FIG. 8. First, for example, a substantially cylindrical formed honeycomb article 1a constituted of cells 3 with the same shape and an equal size and having plasticity is formed (it is to be noted that the shape of each cell 3 or the main body of the honeycomb structure 1 is not limited to this example). Then, water is put in a water tank 41 or the like, a sheet 35 having openings only in positions corresponding to at least a part of the cells 3 is attached to the upper end face of the formed honeycomb article 1a, the formed honeycomb article 1a is directed so that the axial direction thereof is a gravity direction, and the end face of the article to which the sheet 35 is not attached is immersed into the water. At this time, solid particles 17 capable of forming a slurry when dissolved in water and having diameters smaller than cell diameters are sprinkled from the upside of the sheet, and the solid particles 17 drop down through the cells 3, reach the water, are slurried and adhere to the partition walls 4 to form the protruding portions 11. Subsequently, a water depth is changed to vary an entering depth in each cell 3, thereby performing the immersion into the water. This is performed a plurality of times, and in each water immersion step, solid particles 17 capable of forming a slurry when dissolved in water and having diameters smaller than cell diameters are sprinkled from the upside of the sheet, and the solid particles 17 are slurried and adhere to the partition walls to form the protruding portions 11. Afterward, drying and firing are performed to obtain the honeycomb structure 1. Then, a catalyst is carried to obtain a honeycomb catalytic body 50.

In Embodiment 5 shown in FIG. 9, the regions 12 arranged on the surfaces of the partition walls 4 and having different surface roughnesses are preferably formed to obtain widths W of 1 mm or more and 10 mm or less in a direction along the cells as through channels. When the structure is formed in this manner, a contact area between an exhaust gas and catalyst layers 5 can be enlarged to form a compact honeycomb catalytic body 50 which is more excellent in purification efficiency and which can be mounted even in a limited space.

Figure 10:
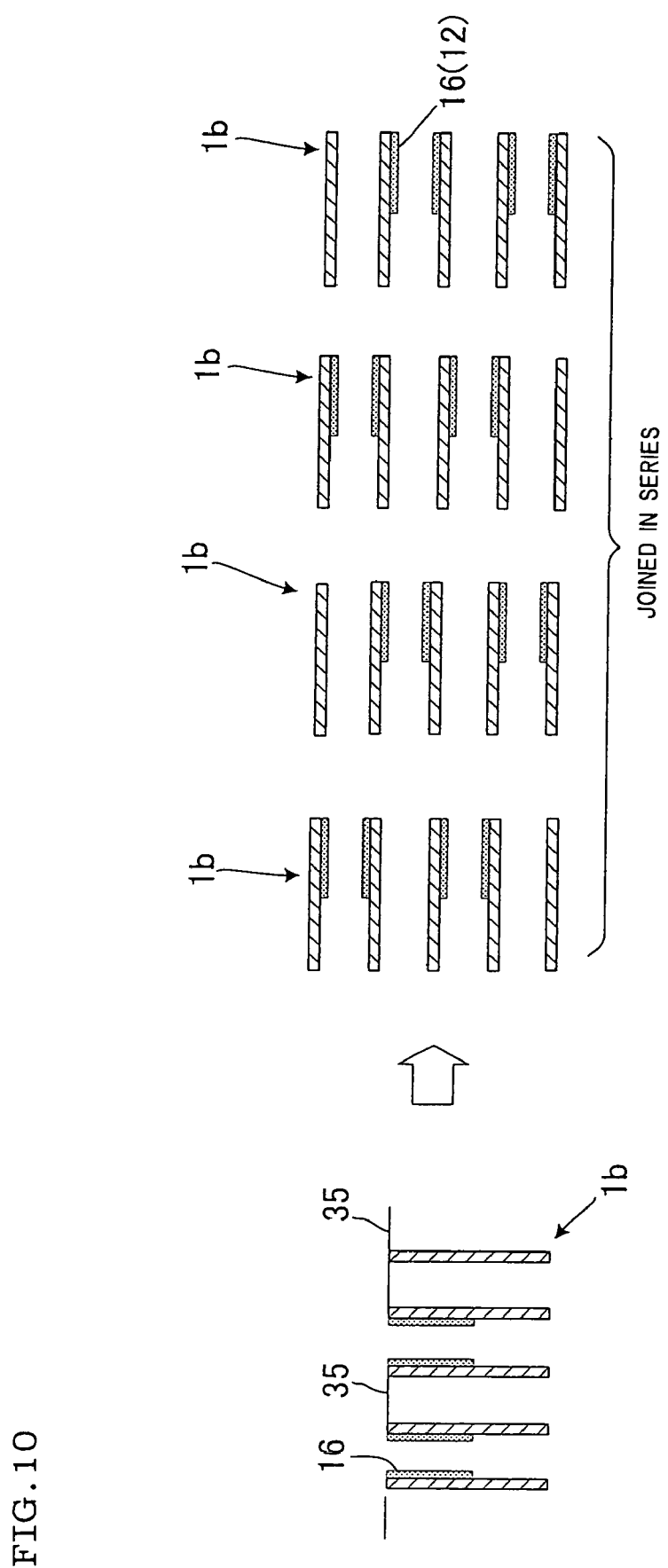
FIG. 10 is an explanatory view explaining a manufacturing method of the honeycomb structure of Embodiment 5.

Next, a manufacturing method of the honeycomb structure 1 of Embodiment 5 will be described with reference to FIG. 10. First, for example, substantially cylindrical divided honeycomb articles 1b constituted of cells with the same shape and an equal size and having plasticity are formed, the articles each having a length obtained by dividing an intended final length (it is to be noted that the shape of each cell 3 or a main body of the honeycomb structure 1 is not limited to this example). Then, a sheet 35 having openings only corresponding to cells to be provided with regions having different surface roughnesses is attached to the end face of each divided honeycomb article 1b, the face of the sheet is coated with a honeycomb material slurry 16 blended with particles having particle diameters different from those of a raw material of a main body of the divided honeycomb article to form regions 12 having different surface states, and the divided honeycomb articles 1b are joined in series so as to obtain the intended length, followed by drying and firing, thereby obtaining the honeycomb structure. Moreover, a catalyst is carried to obtain a honeycomb catalytic body 50.

Embodiment 6

In a honeycomb structure 1 of Embodiment 6, partition walls 4 are curved so as to prevent a fluid from flowing straight through cells 3. Hereinafter, a curved structure of the partition walls 4 will be described.

In Embodiment 6 of the honeycomb structure 1 of the present invention, the partition walls 4 twist in a range of 1 to 9°/cm per honeycomb structure length in a rotating direction around the central axis from one end forming an inlet to the other end forming an outlet, to curve the partition walls. When the partition walls 4 curve to be twisted around the central axis of the honeycomb structure 1 in this manner, a gas circulated through cells 3 is pressed onto the partition walls 4 by inertia, and a part of the gas can pass through the partition walls 4. In consequence, when a catalyst is carried on the surfaces of the partition walls of the honeycomb structure 1 and in pores of the partition walls 4, the catalyst carried in the pores of the partition walls 4 can come in contact with the gas passing through the partition walls 4, a contact area between the gas and the catalyst can be increased as a whole, and a purification efficiency can be improved without increasing a pressure loss. A degree of the twisting of each partition wall 4 (a twist degree θ) is preferably 1 to 9°/cm per honeycomb structure length, further preferably 1 to 4.5°/cm. When the twist degree is smaller than 1°/cm, an effect of improving the purification efficiency sometimes decreases. If the twist degree is larger than 9°/cm, the pressure loss at a time when the gas is circulated through the cells sometimes increases.

Figure 12A:
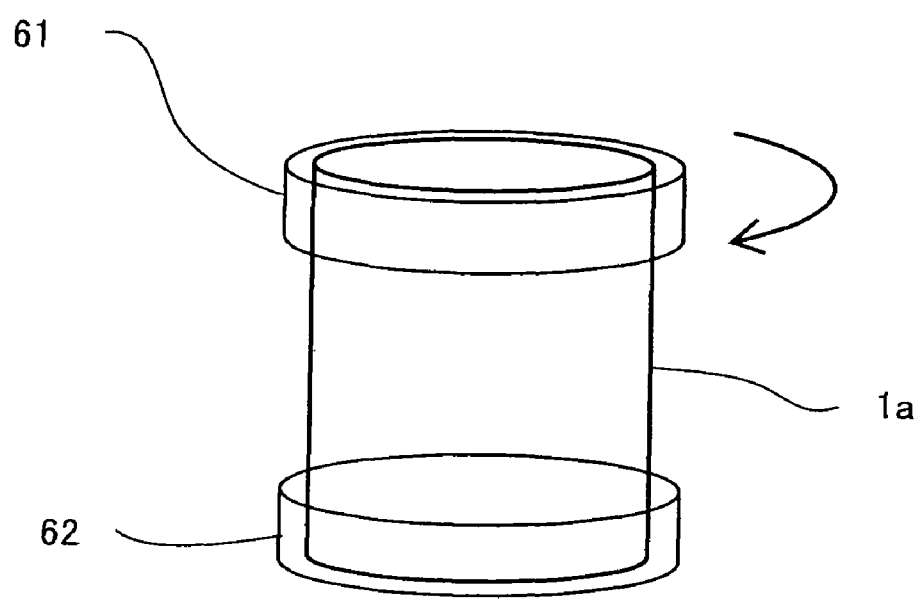
FIG. 12A is a perspective view schematically showing a process of manufacturing Embodiment 6 of the honeycomb structure and the honeycomb catalytic body of the present invention.
Figure 12B:
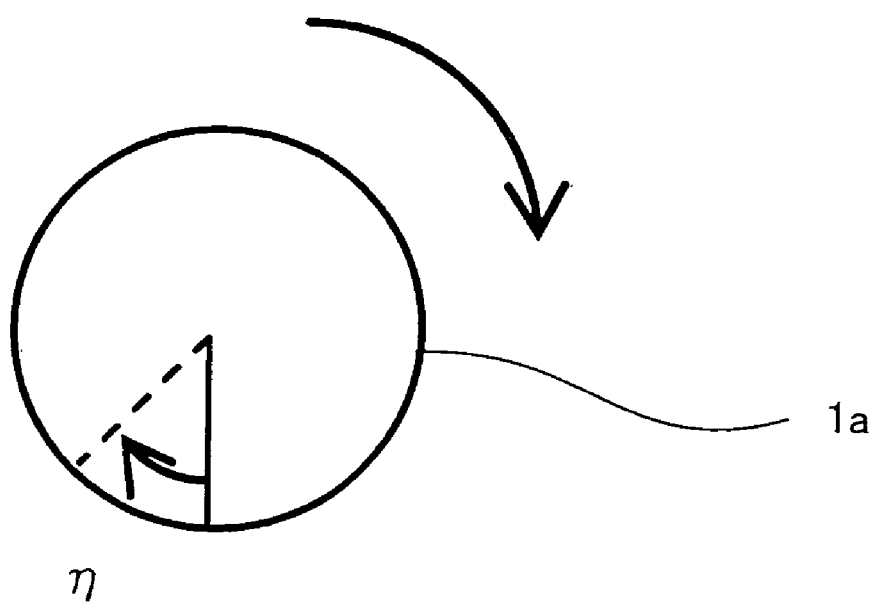
FIG. 12B is a plan view schematically showing the process of manufacturing Embodiment 6 of the honeycomb structure and the honeycomb catalytic body of the present invention.

Next, a manufacturing method of the honeycomb structure 1 will be described. To prepare the honeycomb structure in which the partition walls twist and curve in the range of the twist degree θ of 1 to 9°/cm per honeycomb structure length in the rotating direction around the central axis from one end to the other end, as shown in FIGS. 12A, 12B, after forming a formed honeycomb article 21 which does not curve, side surface portions of both ends of the formed honeycomb article are preferably grasped with grasping tools 61, 62 to rotate one or both of the grasping tools, thereby twisting the formed honeycomb article in a range of 1 to 9°/cm. FIG. 12A is a perspective view schematically showing a process of manufacturing Embodiment 6 of the honeycomb structure of the present invention, and FIG. 12B is a plan view schematically showing the process of manufacturing Embodiment 6 of the honeycomb structure of the present invention. The formed honeycomb article 21 having the curved partition walls 4 is dried and fired to obtain the honeycomb structure 1, and a catalyst can be carried to obtain a honeycomb catalytic body 50.

EXAMPLES

Hereinafter, the present invention will specifically be described in accordance with examples, but the present invention is not limited to these examples.

[Pore Diameters] Pore diameters are measured by a mercury porosimeter (mercury intrusion technique), and are pore diameters calculated from a pressure in a case where an accumulated capacity of mercury put under pressure into a porous base material is 50% of the total pore capacity of the porous base material. As the mercury porosimeter, trade name: Auto Pore III, model 9405 manufactured by Micromeritics Co. was used.

[Porosity] A mercury porosimeter was used in the same manner as in the measurement of the pore diameters.

[Permeability] A part of partition walls was taken and processed so as to eliminate recessed and projecting portions, to obtain a sample, and this sample was vertically held by a φ20 mm sample holder so as to prevent gas leakage. Afterward, a specific gas pressure was applied to the sample so as to obtain a pressure of 1 atm on the downstream side of the sample, thereby transmitting a gas. In this case, as to the gas which passed through the sample, a permeability was calculated based on the following equation (1). It is to be noted that in the following equation (1), C is the permeability ($m^2$), F is a gas flow rate ($cm^3/s$), T is a sample thickness (cm), V is a gas viscosity (dynes·sec/$cm^2$), D is a sample diameter (cm), and P is a gas pressure. (PSI), respectively. Moreover, numeric values in the following equation (1) are 13.839 (PSI)=1 (atm), and 68947.6 (dynes·sec/$cm^2$)=1 (PSI). It is to be noted that during the measurement, a device such as trade name "Capillary Flow Pormeter" (manufactured by Porous Materials, Inc., model: 1100 AEX) was used.

$$C = \frac{8FTV}{\pi D^2 (P^2 - 13.839^2)/13.839 \times 68947.6} \times 10^{-4} \quad (1)$$

[Purification Index] An emission test was performed by an operation mode (LA-4) of Federal Test Procedure (FTP) by use of a gasoline engine vehicle of 2 liter displacement. A purification ratio (%) was calculated from a ratio between emission values before and after attaching a honeycomb catalytic body. The purification ratio (a reference purification ratio (%)) was calculated using a comparative honeycomb catalytic body, and a purification index (%) was calculated as a ratio with respect to this reference purification ratio. Here, a purification index=200% is a double ratio of the purification ratio of the comparative honeycomb catalytic body.

Examples 1 to 4, Comparative Examples 1 and 2

A plurality of components selected from the group consisting of talc, kaolin, calcined kaolin, alumina, aluminum hydroxide and silica were combined at a predetermined ratio so as to obtain a chemical composition including 42 to 56 mass % of $SiO_2$, 0 to 45 mass % of $Al_2O_3$ and 12 to 16 mass % of MgO, thereby preparing a cordierite forming material. To 100 parts by mass of the cordierite forming material were added 12 to 25 parts by mass of graphite as a pore former and 5 to 15 parts by mass of synthetic resin. Furthermore, appropriate amounts of methyl cellulose and a surfactant were added, then water was added thereto, and the resultant mixture was kneaded to prepare a kneaded clay. The prepared clay was vacuum-deaerated, and then extrusion-formed to obtain a formed honeycomb article. The resultant formed honeycomb article was dried and then fired in a maximum temperature range of 1400 to 1430° C. to prepare a honeycomb structure having a partition wall pore structure shown in Table 1, a diameter of 100 mm and the total length of 100 mm (Examples 1 to 4, Comparative Examples 1 and 2).

Examples 5 to 24

After obtaining each formed honeycomb article in the same manner as in the above examples, a substantially cylindrical formed honeycomb article constituted of cells with the same shape and an equal size and having plasticity was formed. Afterward, by using a cell shape reforming jig including a large number of protrusions tapered toward a tip thereof and having a function of optically measuring the arrangement of the cells of the formed honeycomb article to align the protruding positions of the protrusions in accordance with the arrangement, the protrusions of the cell shape reforming jig were inserted into cells of the formed honeycomb article from both end face sides to change cell hydraulic diameters, followed by firing, to prepare a honeycomb structure.

Examples 25 to 42

After obtaining formed honeycomb articles in the same manner as in the above examples, honeycomb structures were prepared so that the surfaces of partition walls 4 regularly or randomly had a plurality of protruding portions 11. Moreover, in these honeycomb structures, the protruding portions 11 were formed by a method of preparing divided honeycomb articles as described with reference to FIG. 7 to join the articles together.

Examples 1 to 42, Comparative Examples 1, 2

A catalyst slurry was prepared, the slurry containing platinum (Pt) and rhodium (Rh) as noble metals and further containing active alumina and ceria as an oxygen occluding agent. By a suction process, coat layers of the prepared catalyst slurry were formed on the inner surfaces of partition walls and the inner surfaces of pores in the honeycomb structures of Examples 1 to 42 and Comparative Examples 1, 2. Subsequently, the structures were heated and dried to prepare honeycomb catalytic bodies (Examples 1 to 42, Comparative Examples 1 and 2) having a pore structure of partition walls (provided with catalyst layers) described in Tables 1 to 3. It is to be noted that an amount of the noble metals (Pt+Rh) per liter of the honeycomb structure (a carrier) was 2 g. Moreover, a coat amount of the catalyst slurry per liter of the honeycomb structure (the carrier) was 150 g.

Results of Examples 1 to 42, Comparative Examples 1, 2 are shown in Tables 1 to 6. It is to be noted that "cpsi" is the abbreviation of "cells per square inch" and is a unit indicating the number of the cells per square inch. 10 cpsi is about 1.55 cells/$cm^2$. Moreover, 1 mil is 1/1000 inch, and is about 0.025 mm. Hd1, Hd2, 1 and L are lengths shown in FIG. 3, and P, H and W are lengths shown in FIGS. 6, 9 and the like (Hd of FIGS. 6, 9 is described as Hd1, Hd2 in the tables).

TABLE 1

| | Embodiment | Cell density cpsi | Cell density 1/cm² | Rib thickness mil | Rib thickness mm | Porosity % | Average pore diameter μm | Permeability of catalyst carrying partition wall m² | Honeycomb catalytic body Diameter mm | Honeycomb catalytic body Length mm |
|---|---|---|---|---|---|---|---|---|---|---|
| Comparative Example 1 | — | 600 | 93 | 3.5 | 0.089 | 35 | 0.5 | 0 | 100 | 100 |
| Comparative Example 2 | — | 600 | 93 | 3.5 | 0.089 | 35 | 10 | $0.8 \times 10^{-12}$ | 100 | 100 |
| Example 1 | 1 | 200 | 31 | 12 | 0.305 | 65 | 40 | $4 \times 10^{-12}$ | 100 | 100 |
| Example 2 | 1 | 400 | 62 | 6.5 | 0.165 | 65 | 40 | $4 \times 10^{-12}$ | 100 | 100 |
| Example 3 | 1 | 600 | 93 | 3.5 | 0.089 | 60 | 30 | $2 \times 10^{-12}$ | 100 | 100 |
| Example 4 | 1 | 900 | 139.5 | 2.5 | 0.064 | 60 | 20 | $1.5 \times 10^{-12}$ | 100 | 100 |
| Example 5 | 2 | 200 | 31 | 12 | 0.305 | 65 | 40 | $4 \times 10^{-12}$ | 100 | 100 |
| Example 6 | 2 | 400 | 62 | 6.5 | 0.165 | 65 | 40 | $4 \times 10^{-12}$ | 100 | 100 |
| Example 7 | 2 | 600 | 93 | 3.5 | 0.089 | 60 | 30 | $2 \times 10^{-12}$ | 100 | 100 |
| Example 8 | 2 | 900 | 139.5 | 2.5 | 0.064 | 60 | 20 | $1.5 \times 10^{-12}$ | 100 | 100 |
| Example 9 | 2 | 200 | 31 | 12 | 0.305 | 65 | 40 | $4 \times 10^{-12}$ | 100 | 100 |
| Example 10 | 2 | 400 | 62 | 6.5 | 0.1651 | 65 | 40 | $4 \times 10^{-12}$ | 100 | 100 |
| Example 11 | 2 | 600 | 93 | 3.5 | 0.089 | 60 | 30 | $2 \times 10^{-12}$ | 100 | 100 |
| Example 12 | 2 | 900 | 139.5 | 2.5 | 0.064 | 60 | 20 | $1.5 \times 10^{-12}$ | 100 | 100 |

TABLE 2

| | Embodiment | Hd1 mm | Hd2 mm | I mm | L mm | P mm | H mm | W mm | HC purification index | NOx purification index | Pressure loss index |
|---|---|---|---|---|---|---|---|---|---|---|---|
| Comparative Example 1 | — | 0.9 | 0.9 | — | — | — | — | — | 1 | 1 | 1 |
| Comparative Example 2 | — | 0.9 | 0.9 | — | — | — | — | — | 1 | 1 | 1 |
| Example 1 | 1 | 1.4 | 1.4 | — | — | — | — | — | 1.01 | 1.03 | 0.5 |
| Example 2 | 1 | 1.1 | 1.1 | — | — | — | — | — | 1.05 | 1.05 | 0.8 |
| Example 3 | 1 | 0.9 | 0.9 | — | — | — | — | — | 1.15 | 1.2 | 1 |
| Example 4 | 1 | 0.75 | 0.75 | — | — | — | — | — | 1.25 | 1.25 | 1.2 |
| Example 5 | 2 | 1.55 | 1.25 | 5 | 100 | — | — | — | 1.03 | 1.05 | 0.6 |
| Example 6 | 2 | 1.25 | 0.95 | 5 | 100 | — | — | — | 1.2 | 1.25 | 0.9 |
| Example 7 | 2 | 1 | 0.8 | 5 | 100 | — | — | — | 1.35 | 1.3 | 1.05 |
| Example 8 | 2 | 0.85 | 0.65 | 5 | 100 | — | — | — | 1.4 | 1.4 | 1.25 |
| Example 9 | 2 | 1.55 | 1.25 | 20 | 100 | — | — | — | 1.05 | 1.06 | 0.55 |
| Example 10 | 2 | 1.25 | 0.95 | 20 | 100 | — | — | — | 1.25 | 1.28 | 0.8 |
| Example 11 | 2 | 1 | 0.8 | 20 | 100 | — | — | — | 1.43 | 1.34 | 1.03 |
| Example 12 | 2 | 0.85 | 0.65 | 20 | 100 | — | — | — | 1.42 | 1.42 | 1.2 |

TABLE 3

| | Embodiment | Cell density cpsi | Cell density 1/cm² | Rib thickness mil | Rib thickness mm | Porosity % | Average pore diameter μm | Permeability of catalyst carrying partition wall m² | Honeycomb catalytic body Diameter mm | Honeycomb catalytic body Length mm |
|---|---|---|---|---|---|---|---|---|---|---|
| Example 13 | 3 | 200 | 31 | 12 | 0.305 | 65 | 40 | $4 \times 10^{-12}$ | 100 | 100 |
| Example 14 | 3 | 400 | 62 | 6.5 | 0.165 | 65 | 40 | $4 \times 10^{-12}$ | 100 | 100 |
| Example 15 | 3 | 600 | 93 | 3.5 | 0.089 | 60 | 30 | $2 \times 10^{-12}$ | 100 | 100 |
| Example 16 | 3 | 900 | 139.5 | 2.5 | 0.064 | 60 | 20 | $1.5 \times 10^{-12}$ | 100 | 100 |
| Example 17 | 3 | 200 | 31 | 12 | 0.305 | 65 | 40 | $4 \times 10^{-12}$ | 100 | 100 |
| Example 18 | 3 | 400 | 62 | 6.5 | 0.165 | 65 | 40 | $4 \times 10^{-12}$ | 100 | 100 |
| Example 19 | 3 | 600 | 93 | 3.5 | 0.089 | 60 | 30 | $2 \times 10^{-12}$ | 100 | 100 |
| Example 20 | 3 | 900 | 139.5 | 2.5 | 0.064 | 60 | 20 | $1.5 \times 10^{-12}$ | 100 | 100 |
| Example 21 | 3 | 200 | 31 | 12 | 0.305 | 65 | 40 | $4 \times 10^{-12}$ | 100 | 100 |
| Example 22 | 3 | 400 | 62 | 6.5 | 0.165 | 65 | 40 | $4 \times 10^{-12}$ | 100 | 100 |
| Example 23 | 3 | 600 | 93 | 3.5 | 0.089 | 60 | 30 | $2 \times 10^{-12}$ | 100 | 100 |
| Example 24 | 3 | 900 | 139.5 | 2.5 | 0.064 | 60 | 20 | $1.5 \times 10^{-12}$ | 100 | 100 |

TABLE 4

| Example | Embodiment | Hd1 mm | Hd2 mm | I mm | L mm | P mm | H mm | W mm | HC purification index | NOx purification index | Pressure loss index |
|---|---|---|---|---|---|---|---|---|---|---|---|
| Example 13 | 3 | 1.55 | 1.25 | 100 | 100 | — | — | — | 1.06 | 1.07 | 0.52 |
| Example 14 | 3 | 1.25 | 0.95 | 100 | 100 | — | — | — | 1.3 | 1.35 | 0.78 |
| Example 15 | 3 | 1 | 0.8 | 100 | 100 | — | — | — | 1.45 | 1.4 | 1.01 |
| Example 16 | 3 | 0.85 | 0.65 | 100 | 100 | — | — | — | 1.43 | 1.44 | 1.18 |
| Example 17 | 3 | 1.6 | 1.2 | 100 | 100 | — | — | — | 1.07 | 1.07 | 0.52 |
| Example 18 | 3 | 1.3 | 0.9 | 100 | 100 | — | — | — | 1.34 | 1.36 | 0.78 |
| Example 19 | 3 | 1.1 | 0.7 | 100 | 100 | — | — | — | 1.48 | 1.43 | 1.01 |
| Example 20 | 3 | 0.95 | 0.55 | 100 | 100 | — | — | — | 1.45 | 1.5 | 1.18 |
| Example 21 | 3 | 1.8 | 1 | 100 | 100 | — | — | — | 1.2 | 1.3 | 0.52 |
| Example 22 | 3 | 1.5 | 0.7 | 100 | 100 | — | — | — | 1.55 | 1.55 | 0.78 |
| Example 23 | 3 | 1.3 | 0.5 | 100 | 100 | — | — | — | 1.6 | 1.65 | 1.01 |
| Example 24 | 3 | 1.15 | 0.35 | 100 | 100 | — | — | — | 1.7 | 1.75 | 1.18 |

TABLE 5

| | | Cell density | | Rib thickness | | Porosity | Average pore diameter | Permeability of catalyst carrying partition wall | Honeycomb catalytic body | |
|---|---|---|---|---|---|---|---|---|---|---|
| | Embodiment | cpsi | 1/cm$^2$ | mil | mm | % | μm | m$^2$ | Diameter mm | Length mm |
| Example 25 | 4 | 200 | 31 | 12 | 0.305 | 65 | 40 | 4 × 10$^{-12}$ | 100 | 100 |
| Example 26 | 4 | 400 | 62 | 6.5 | 0.165 | 65 | 40 | 4 × 10$^{-12}$ | 100 | 100 |
| Example 27 | 4 | 600 | 93 | 3.5 | 0.089 | 60 | 30 | 2 × 10$^{-12}$ | 100 | 100 |
| Example 28 | 4 | 900 | 139.5 | 2.5 | 0.064 | 60 | 20 | 1.5 × 10$^{-12}$ | 100 | 100 |
| Example 29 | 4 | 200 | 31 | 12 | 0.305 | 65 | 40 | 4 × 10$^{-12}$ | 100 | 100 |
| Example 30 | 4 | 400 | 62 | 6.5 | 0.165 | 65 | 40 | 4 × 10$^{-12}$ | 100 | 100 |
| Example 31 | 4 | 600 | 93 | 3.5 | 0.089 | 60 | 30 | 2 × 10$^{-12}$ | 100 | 100 |
| Example 32 | 4 | 900 | 139.5 | 2.5 | 0.064 | 60 | 20 | 1.5 × 10$^{-12}$ | 100 | 100 |
| Example 33 | 4 | 400 | 62 | 6.5 | 0.165 | 65 | 40 | 4 × 10$^{-12}$ | 100 | 100 |
| Example 34 | 4 | 400 | 62 | 6.5 | 0.165 | 65 | 40 | 4 × 10$^{-12}$ | 100 | 100 |
| Example 35 | 4 | 400 | 62 | 6.5 | 0.165 | 65 | 40 | 4 × 10$^{-12}$ | 100 | 100 |
| Example 36 | 4 | 400 | 62 | 6.5 | 0.165 | 65 | 40 | 4 × 10$^{-12}$ | 100 | 100 |
| Example 37 | 4 | 400 | 62 | 6.5 | 0.165 | 65 | 40 | 4 × 10$^{-12}$ | 100 | 100 |
| Example 38 | 4 | 400 | 62 | 6.5 | 0.165 | 65 | 40 | 4 × 10$^{-12}$ | 100 | 100 |
| Example 39 | 4 | 400 | 62 | 6.5 | 0.165 | 65 | 40 | 4 × 10$^{-12}$ | 100 | 100 |
| Example 40 | 4 | 400 | 62 | 6.5 | 0.165 | 65 | 40 | 4 × 10$^{-12}$ | 100 | 100 |
| Example 41 | 4 | 400 | 62 | 6.5 | 0.165 | 65 | 40 | 4 × 10$^{-12}$ | 100 | 100 |
| Example 42 | 4 | 400 | 62 | 6.5 | 0.165 | 65 | 40 | 4 × 10$^{-12}$ | 100 | 100 |

TABLE 6

| Example | Embodiment | Hd1 mm | Hd2 mm | I mm | L mm | P mm | H mm | W mm | HC purification index | NOx purification index | Pressure loss index |
|---|---|---|---|---|---|---|---|---|---|---|---|
| Example 25 | 4 | 1.4 | 1.4 | — | 100 | 20 | 0.4 | 5 | 1.06 | 1.07 | 0.52 |
| Example 26 | 4 | 1.1 | 1.1 | — | 100 | 20 | 0.3 | 5 | 1.3 | 1.35 | 0.78 |
| Example 27 | 4 | 0.9 | 0.9 | — | 100 | 20 | 0.2 | 5 | 1.45 | 1.4 | 1.01 |
| Example 28 | 4 | 0.75 | 0.75 | — | 100 | 20 | 0.2 | 5 | 1.43 | 1.44 | 1.18 |
| Example 29 | 4 | 1.4 | 1.4 | — | 100 | 35 | 0.4 | 5 | 1.05 | 1.06 | 0.51 |
| Example 30 | 4 | 1.1 | 1.1 | — | 100 | 35 | 0.3 | 5 | 1.25 | 1.32 | 0.76 |
| Example 31 | 4 | 0.9 | 0.9 | — | 100 | 35 | 0.2 | 5 | 1.43 | 1.38 | 1.01 |
| Example 32 | 4 | 0.75 | 0.75 | — | 100 | 35 | 0.2 | 5 | 1.41 | 1.44 | 1.15 |
| Example 33 | 4 | 1.1 | 1.1 | — | 100 | 35 | 0.05 | 5 | 1.1 | 1.12 | 0.7 |
| Example 34 | 4 | 1.1 | 1.1 | — | 100 | 35 | 0.1 | 5 | 1.15 | 1.2 | 0.73 |
| Example 35 | 4 | 1.1 | 1.1 | — | 100 | 35 | 0.15 | 5 | 1.2 | 1.25 | 0.75 |
| Example 36 | 4 | 1.1 | 1.1 | — | 100 | 35 | 0.2 | 5 | 1.23 | 1.3 | 0.75 |
| Example 37 | 4 | 1.1 | 1.1 | — | 100 | 35 | 0.3 | 2 | 1.25 | 1.32 | 0.7 |
| Example 38 | 4 | 1.1 | 1.1 | — | 100 | 35 | 0.3 | 7 | 1.25 | 1.32 | 0.73 |
| Example 39 | 4 | 1.1 | 1.1 | — | 100 | 35 | 0.3 | 10 | 1.25 | 1.32 | 0.75 |
| Example 40 | 4 | 1.1 | 1.1 | — | 100 | 35 | 0.3 | 15 | 1.1 | 1.15 | 0.8 |
| Example 41 | 4 | 1.1 | 1.1 | — | 100 | 5 to 30 (Random) | 0.3 | 2 to 5 | 1.25 | 1.3 | 0.78 |
| Example 42 | 4 | 1.1 | 1.1 | — | 100 | 15 to 40 (Random) | 0.3 | 2 to 5 | 1.18 | 1.28 | 0.75 |

Examples 43 to 48, Comparative Example 3

In Examples 43 to 48, formed honeycomb articles were obtained in the same manner as in the above examples except that 5 to 15 parts by mass of iron powder having an average particle diameter of 70 μm as a pinhole forming material, and 5 to 25 parts by mass of synthetic resin were added to 100 parts by mass of cordierite forming material prepared at a predetermined ratio, and a partition wall structure was formed as shown in Table 7. Afterward, as shown in FIGS. 12A and 12B, before a drying step, side surface portions of both ends of each formed honeycomb article were grasped, and one end face side of the article was rotated as much as a twist degree θ shown in Table 7 to twist cells. Then, the article was fired to prepare a honeycomb structure. As shown in FIG. 12B, the twist degree θ is defined as a value obtained by dividing an angle η of the rotation of the one end face side (the opposite end face side was fixed) by the length of the honeycomb structure. It is to be noted that Comparative Example 3 was not twisted.

the same cell structure (Comparative Example 3). Moreover, as to a pressure loss, the HC(NOx) purification index/a pressure loss index improves (becomes larger than 1) as compared with Comparative Example 3, and improvement of the purification performance is confirmed as compared to the increase of the cell density.

INDUSTRIAL APPLICABILITY

A honeycomb catalytic body of the present invention is excellent in purification efficiency, has an only small pressure loss and can be mounted even in a limited space. Therefore, the honeycomb catalytic body of the present invention is preferably used to remove components to be removed from an exhaust gas discharged from, for example, a stational engine for a car, a construction machine or an industry, a combustion device or the like.

The invention claimed is:

1. A honeycomb structure of a flow-through type through which cells, as through channels, extend from an inlet to an outlet, wherein

TABLE 7

| | Partition wall structure | | | Pore structure | | Pinhole | | | |
|---|---|---|---|---|---|---|---|---|---|
| | Cell density | | Rib thickness | Porosity | Average pore diameter | Density | Average diameter | Twist degree | Permeability of catalyst carrying partition wall |
| | cpsi | 1/cm² | mil | mm | % | μm | pinholes/cm² | μm | °/cm | m² |
| Comparative Example 3 | 300 | 47 | 12 | 0.3 | 65 | 20 | 0 | — | 0 | 6 × 10⁻¹² |
| Example 43 | 300 | 47 | 12 | 0.30 | 65 | 20 | 30 | 200 | 1.0 | 6 × 10⁻¹² |
| Example 44 | 300 | 47 | 12 | 0.30 | 65 | 20 | 30 | 200 | 1.5 | 6 × 10⁻¹² |
| Example 45 | 300 | 47 | 12 | 0.30 | 65 | 20 | 30 | 200 | 2.0 | 6 × 10⁻¹² |
| Example 46 | 400 | 62 | 10 | 0.25 | 65 | 20 | 30 | 200 | 1.0 | 6 × 10⁻¹² |
| Example 47 | 400 | 62 | 10 | 0.25 | 65 | 20 | 30 | 200 | 1.5 | 6 × 10⁻¹² |
| Example 48 | 400 | 62 | 10 | 0.25 | 65 | 20 | 30 | 200 | 2.0 | 6 × 10⁻¹² |

TABLE 8

| | HC purification index A | NOx purification index B | Pressure loss index C | A/C | B/C |
|---|---|---|---|---|---|
| Comparative Example 3 | 1 | 1 | 1 | 1 | 1 |
| Example 43 | 1.08 | 1.08 | 1.04 | 1.04 | 1.04 |
| Example 44 | 1.14 | 1.14 | 1.08 | 1.06 | 1.06 |
| Example 45 | 1.20 | 1.20 | 1.12 | 1.07 | 1.07 |
| Example 46 | 1.17 | 1.17 | 1.15 | 1.02 | 1.02 |
| Example 47 | 1.21 | 1.21 | 1.18 | 1.03 | 1.03 |
| Example 48 | 1.30 | 1.30 | 1.20 | 1.08 | 1.08 |

The permeability of the catalyst carrying partition walls can be set to $1.5 \times 10^{-12}$ to $4 \times 10^{-12}$ [m²] in Examples 1 to 42 to improve the HC purification index and the NOx purification index as compared with the Comparative Examples 1 and 2. In Examples 5 to 8 and 9 to 12 of Embodiment 2, Hd1, Hd2 and l can be changed to further improve the HC purification index and the NOx purification index. Similarly, in Examples 13 to 16, 17 to 20 and 21 to 24 of Embodiment 3, Hd1, Hd2 and l can be changed to further improve the HC purification index and the NOx purification index. Moreover, in Examples 25 to 28, 29 to 32 and 33 to 36 of Embodiment 4, P, H and W can be changed to further improve the HC purification index and the NOx purification index.

Furthermore, Examples 43 to 48 indicate that since the twist degree θ is 1.0°/cm or more, a purification performance improves as compared with a comparative example having the cells are defined by partition walls having pores, which communicate from a surface on one cell side to a surface on another cell side, the partition walls have a permeability of $1.5 \times 10^{-12}$ [m²] or more, and the cells are arranged such that:

an outlet end face cell, having a cell hydraulic diameter that is smaller than that of an inlet end face cell, is disposed adjacent to an outlet end face cell, having a cell hydraulic diameter that is larger than that of the inlet end face cell, and the outlet end face cell and the inlet end face cell are open.

2. The honeycomb structure according to claim 1, wherein a cell hydraulic diameter of at least one of the cells varies between the inlet and the outlet, and cells adjacent each other have different cell hydraulic diameters in at least a part of the honeycomb structure.

3. The honeycomb structure according to claim 1, wherein the surfaces of the partition walls have a plurality of protruding portions or regions having different surface roughnesses.

4. The honeycomb structure according to claim 3, wherein the protruding portions or the regions having the different surface roughnesses are arranged alternately at intervals of 3 mm or more and 40 mm or less on the surfaces of the partition walls in a direction along the cells.

5. The honeycomb structure according to claim 3, wherein the protruding portions on the surfaces of the partition walls have widths of 1 mm or more and 10 mm or less, and have heights in excess of 0.1 mm in the direction along the cells.

6. The honeycomb structure according to claim 1, wherein the partition walls twist and curve in a range of 1 to 9°/cm per honeycomb structure length in a rotating direction around a central axis from one end forming the inlet to the other end forming the outlet so as to prevent a fluid from flowing straight through the cells.

7. The honeycomb structure according to claim 1, wherein a cell density is in a range of 40 cells/cm$^2$ or more and less than 100 cells/cm$^2$, and partition wall thicknesses are in a range of 50 μm or more and less than 200 μM.

8. A honeycomb catalytic body of a flow-through type through which cells, as through channels, extend from an inlet to an outlet, wherein the cells are defined by partition walls having pores, which communicate from a surface on one cell side to a surface on another cell side, both surfaces of the partition walls and inner surfaces of the pores carry a catalyst, the partition walls, having the catalyst carried thereon, have a permeability of $1 \times 10^{-12}$ [m$^2$] or more, and the cells are arranged such that:

an outlet end face cell, having a cell hydraulic diameter that is smaller than that of an inlet end face cell, is disposed adjacent to another outlet end face cell, having a cell hydraulic diameter that is larger than that of the inlet end face cell, and the outlet end face cell and the inlet end face cell are open.

9. The honeycomb catalytic body according to claim 8, wherein a cell hydraulic diameter of at least one of the cells varies between the inlet and the outlet, and cells adjacent each other have different cell hydraulic diameters in at least a part of the honeycomb structure.

10. The honeycomb catalytic body according to claim 8, wherein the surfaces of the partition walls have a plurality of protruding portions or regions having different surface roughnesses.

11. The honeycomb catalytic body according to claim 10, wherein the surfaces of the partition walls are provided with the protruding portions or the regions having the different surface roughnesses arranged at intervals of 3 mm or more and 40 mm or less in a direction along the cells.

12. The honeycomb catalytic body according to claim 10, wherein the protruding portions on the surfaces of the partition walls have widths of 1 mm or more and 10 mm or less in a direction along the cells, and have heights in excess of 0.1 mm.

13. The honeycomb catalytic body according to claim 8, wherein the partition walls twist and curve in a range of 1 to 9°/cm per honeycomb catalytic body length in a rotating direction around a central axis from one end forming the inlet to the other end forming the outlet so as to prevent a fluid from flowing straightly through the cells.

14. The honeycomb catalytic body according to claim 8, wherein a cell density is in a range of 40 cells/cm$^2$ or more and less than 100 cells/cm$^2$, and partition wall thicknesses are in a range of 50 μm or more and less than 200 μm.

15. The honeycomb catalytic body according to claim 8, wherein the catalyst is a gasoline engine exhaust gas purifying ternary catalyst including:

a carrier coat made of active alumina, one or more noble metals selected from the group consisting of Pt, Rh and Pd and dispersed and carried in the carrier coat, and one or more compounds selected from the group consisting of cerium oxide, zirconia oxide and silica and contained in the carrier coat.

16. The honeycomb catalytic body according to claim 8, wherein the catalyst is an oxidation catalyst containing one or more noble metals selected from the group consisting of Pt, Rh and Pd for purifying an exhaust gas from a gasoline engine or a diesel engine.

17. The honeycomb catalytic body according to claim 8, wherein the catalyst is an SCR catalyst for NO$_x$ selective reduction containing at least one compound selected from the group consisting of metal-substituted zeolite, vanadium, titania, tungsten oxide, silver and alumina.

18. The honeycomb catalytic body according to claim 8, wherein the catalyst is an NO$_x$ occluding catalyst containing an alkali metal and/or an alkali earth metal.

19. A manufacturing method of the honeycomb catalytic body according to claim 8, wherein, before carrying the catalyst on the inner surfaces of the pores of the partition walls, at least the inner surfaces of the pores of the partition walls are coated with alumina, which does not contain any noble metal, and then the catalyst is carried on the coated inner surfaces.

20. A manufacturing method of the honeycomb structure according to claim 2, comprising the steps of:

forming a honeycomb article having the formed cells and having plasticity;

using a cell shape reforming jig including a plurality of protrusions tapered toward a tip thereof and having a function of optically measuring an arrangement of the cells of the formed honeycomb article to align protruding positions of protrusions with the cells;

inserting the protrusions of the cell shape reforming jig into the cells of the formed honeycomb article from both end face sides thereof to change the cell hydraulic diameters; and firing the formed honeycomb article.

21. A manufacturing method of the honeycomb structure according to claim 3, wherein the formed honeycomb article having the formed cells and having plasticity is directed so that an axial direction thereof is a gravity direction, and immersed into water a plurality of times to varied immersion depths in the cells, and in each water immersion step, while a sheet having openings in positions corresponding to at least a part of the cells is attached to an upper end face of the formed honeycomb article, solid particles capable of forming a slurry when dissolved in water and having diameters smaller than cell diameters are sprinkled from an upside of the sheet, and the solid particles drop down through the cells, reach the water, adhere as the slurry to the partition walls to form protruding portions, followed by drying and firing the formed honeycomb article.

22. A manufacturing method of the honeycomb structure according to claim 3, comprising the steps of:

forming divided honeycomb articles having the formed cells, having plasticity and having lengths obtained by dividing an intended final length into a plurality of lengths;

attaching, to end faces of the divided honeycomb articles, a sheet having openings only corresponding to the cells to be provided with protruding portions;

partially immersing the divided honeycomb articles into a honeycomb material slurry while the end faces having the attached sheet are directed downwards, to increase partition wall thicknesses, thereby forming the protruding portions;

joining the divided honeycomb articles together in series to obtain the intended final length; and drying and firing the joined honeycomb article.

23. A manufacturing method of the honeycomb structure according to claim 3, comprising the steps of:

forming divided honeycomb articles having the formed cells, having plasticity and having lengths obtained by dividing an intended final length into a plurality of lengths;

attaching, to end faces of the divided honeycomb articles, a sheet having openings only corresponding to the cells to be provided with the regions having the different surface roughnesses;

coating a face of the sheet with a honeycomb material slurry blended with particles having particle diameters different from those of a raw material of main bodies of the divided honeycomb articles to form regions having different surface states;

joining the divided honeycomb articles together in series to form the intended final length; and drying and firing the joined honeycomb article.

\* \* \* \* \*